(12) United States Patent
Vreys et al.

(10) Patent No.: US 12,275,219 B2
(45) Date of Patent: Apr. 15, 2025

(54) MONOVINYLIDENE AROMATIC MULTILAYER SHEET CONTAINING IMPACT MODIFIERS

(71) Applicant: TRINSEO EUROPE GMBH, Pfaeffikon (CH)

(72) Inventors: Mark Georges Vreys, Oostakker (BE); Claude T. E. Van Nuffel, Oostakker (BE); Abidin Balan, Breda (NL)

(73) Assignee: TRINSEO EUROPE GMBH, Pfaeffikon (CH)

( * ) Notice: Subject to any disclaimer, the term of this patent is extended or adjusted under 35 U.S.C. 154(b) by 0 days.

(21) Appl. No.: 18/691,761

(22) PCT Filed: Sep. 14, 2022

(86) PCT No.: PCT/EP2022/075520
§ 371 (c)(1),
(2) Date: Mar. 13, 2024

(87) PCT Pub. No.: WO2023/041577
PCT Pub. Date: Mar. 23, 2023

(65) Prior Publication Data
US 2024/0286393 A1    Aug. 29, 2024

(30) Foreign Application Priority Data

Sep. 14, 2021    (EP) .................... 21196544

(51) Int. Cl.
*B32B 27/30*    (2006.01)
*B29C 48/00*    (2019.01)
(Continued)

(52) U.S. Cl.
CPC .......... *B32B 27/302* (2013.01); *B29C 48/022* (2019.02); *B29C 48/08* (2019.02);
(Continued)

(58) Field of Classification Search
CPC .............. B32B 27/302; B32B 2272/00; B32B 2307/738; B32B 2250/24; B29K 2105/26; Y02P 20/143
See application file for complete search history.

(56) References Cited

U.S. PATENT DOCUMENTS

| 2,727,884 A | 12/1955 | McDonald |
| 3,243,481 A | 3/1966 | Ruffing |

(Continued)

FOREIGN PATENT DOCUMENTS

| BE | 887080 A | 7/1981 |
| CN | 1986635 A | 6/2007 |

(Continued)

OTHER PUBLICATIONS

Extended European Search Report in co-pending European Application No. EP21196544 dated Feb. 24, 2022 (8 pages).

(Continued)

*Primary Examiner* — Jasper Saberi
(74) *Attorney, Agent, or Firm* — Young Basile Hanlon & MacFarlane, P.C.

(57) ABSTRACT

Disclosed herein are compositions including a thermoformable sheet having three of more layers. Two layers include one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin, which exhibit resistance to environmental stress cracking. At least one of the two layers is an outer layer. An inner layer includes post-consumer recycled monovinylidene aromatic monomer containing polymers which are impact modified by a rubber, post-industrial recycled monovinylidene aromatic monomer containing polymers which are impact modified by a rubber. Optionally, the (Continued)

Figure 1:
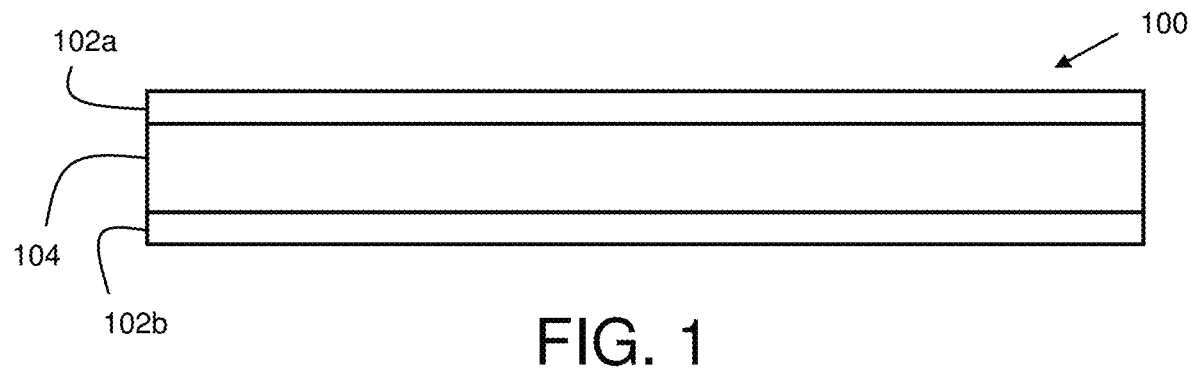

composition may include virgin monovinylidene aromatic monomer containing polymers which are impact modified by a rubber. Optionally, the composition may include an outer layer which is a gloss layer.

18 Claims, 6 Drawing Sheets

(51) Int. Cl.
| | |
|---|---|
| *B29C 48/08* | (2019.01) |
| *B29C 48/18* | (2019.01) |
| *B29C 48/21* | (2019.01) |
| *B32B 27/08* | (2006.01) |
| *B32B 27/18* | (2006.01) |
| *B32B 27/32* | (2006.01) |
| *B29C 48/495* | (2019.01) |
| *B29K 23/00* | (2006.01) |
| *B29K 33/00* | (2006.01) |
| *B29K 33/18* | (2006.01) |
| *B29K 55/00* | (2006.01) |
| *B29K 105/00* | (2006.01) |
| *B29K 105/26* | (2006.01) |

(52) U.S. Cl.
CPC .............. *B29C 48/18* (2019.02); *B29C 48/21* (2019.02); *B32B 27/08* (2013.01); *B32B 27/18* (2013.01); *B32B 27/32* (2013.01); *B29C 48/495* (2019.02); *B29K 2023/00* (2013.01); *B29K 2033/00* (2013.01); *B29K 2033/18* (2013.01); *B29K 2055/00* (2013.01); *B29K 2105/0002* (2013.01); *B29K 2105/0085* (2013.01); *B29K 2105/0088* (2013.01); *B29K 2105/0094* (2013.01); *B29K 2105/26* (2013.01); *B29K 2995/0088* (2013.01); *B32B 2250/24* (2013.01); *B32B 2264/0207* (2013.01); *B32B 2264/302* (2020.08); *B32B 2264/303* (2020.08); *B32B 2270/00* (2013.01); *B32B 2272/00* (2013.01); *B32B 2307/406* (2013.01); *B32B 2307/552* (2013.01); *B32B 2307/558* (2013.01); *B32B 2307/7376* (2023.05); *B32B 2307/738* (2013.01); *B32B 2509/10* (2013.01); *Y02P 20/143* (2015.11); *Y02W 30/62* (2015.05)

(56) References Cited

U.S. PATENT DOCUMENTS

| | | | |
|---|---|---|---|
| 3,660,535 | A | 5/1972 | Finch |
| 4,239,863 | A | 12/1980 | Bredeweg |
| 4,572,819 | A | 2/1986 | Priddy et al. |
| 4,585,825 | A | 4/1986 | Wesselmann |
| 4,666,987 | A | 5/1987 | Burmester et al. |
| 5,221,136 | A * | 6/1993 | Hauck ...................... B32B 5/18 |
| | | | 428/319.7 |
| 5,412,036 | A | 5/1995 | Traugott et al. |
| 5,446,103 | A | 8/1995 | Traugott et al. |
| 5,486,407 | A * | 1/1996 | Noell ...................... B32B 27/08 |
| | | | 156/244.11 |
| 5,532,315 | A * | 7/1996 | Bonekamp .............. C08L 25/02 |
| | | | 521/40.5 |
| 5,716,581 | A | 2/1998 | Tirrell et al. |
| 5,717,029 | A | 2/1998 | Bonekamp et al. |
| 6,027,800 | A | 2/2000 | Sheu |
| 10,018,406 | B2 | 7/2018 | Liu et al. |
| 2002/0061974 | A1 | 5/2002 | Sugden et al. |
| 2002/0107323 | A1 | 8/2002 | Uzee et al. |
| 2005/0179153 | A1* | 8/2005 | Riise ........................ B03C 7/00 |
| | | | 264/211 |
| 2008/0063826 | A1* | 3/2008 | Styranec ............... B29C 51/002 |
| | | | 525/71 |
| 2009/0246501 | A1* | 10/2009 | Shuler .................... B32B 27/36 |
| | | | 264/46.4 |
| 2011/0274900 | A1* | 11/2011 | Megally ................ B32B 27/302 |
| | | | 264/510 |
| 2014/0045961 | A1* | 2/2014 | Welsh ..................... C08F 12/08 |
| | | | 521/146 |
| 2014/0107307 | A1* | 4/2014 | Frost ....................... C08F 12/08 |
| | | | 526/346 |
| 2015/0259481 | A1* | 9/2015 | Wang ...................... C08F 6/001 |
| | | | 525/379 |
| 2021/0316493 | A1* | 10/2021 | Mamak ................ B65D 1/0215 |

FOREIGN PATENT DOCUMENTS

| | | |
|---|---|---|
| CN | 110103547 A | 8/2019 |
| EP | 160974 A2 | 11/1985 |
| EP | 0412801 A1 | 2/1991 |
| EP | 579588 A2 | 1/1994 |
| EP | 747646 A1 | 12/1996 |
| EP | 4147871 A1 | 3/2023 |
| EP | 4148076 A1 | 3/2023 |
| JP | S60181157 A | 9/1985 |
| JP | 2003072863 A | 3/2003 |
| JP | 2010254967 A | 11/2010 |
| JP | 2013226826 A | 11/2013 |
| JP | 2016222751 A | 12/2016 |
| JP | 2019052251 A | 4/2019 |
| JP | 2019206664 A1 | 12/2019 |
| JP | 2020015924 A1 | 1/2020 |
| WO | 1991015366 A1 | 10/1991 |
| WO | 9412551 A1 | 6/1994 |
| WO | 0148043 A1 | 7/2001 |
| WO | 2008134131 A1 | 11/2008 |
| WO | 2009012219 A3 | 5/2009 |
| WO | 2010027655 A1 | 3/2010 |
| WO | 2014131431 A1 | 9/2014 |
| WO | 2015076868 A1 | 5/2015 |
| WO | 2020115023 A1 | 6/2020 |
| WO | WO-2020115022 A1 * | 6/2020 ............ C08F 212/08 |

OTHER PUBLICATIONS

International Preliminary Report on Patentability in co-pending Application No. PCT/EP2022/075520 mailed Jan. 12, 2023 (15 pages).
International Search Report in co-pending International Application No. PCT/EP2022/075520 mailed Jan. 24, 2023 (2 pages).
Meister et al., "Commercial Processes for the Manufacture of Polystyrene", Modern Styrenic Polymers: Polystrenes and Styrenic Copolymers, 29 pages.
Written Opinion of the IPEA in co pending International Application No. PCT/EP2022/075520 mailed Jul. 17, 2023 (6 pages).

* cited by examiner

MONOVINYLIDENE AROMATIC MULTILAYER SHEET CONTAINING IMPACT MODIFIERS

CROSS-REFERENCE TO RELATED APPLICATIONS

This application is a United States National Phase filing under 35 USC371 of PCT Application PCT/EP2022/075520 filed Sep. 14, 2022, published as WO2023/041577, which claims priority from European Patent Application No. 21196544.7 filed Sep. 14, 2021, all of which are incorporated herein by reference in their entirety for all purposes.

FIELD

This disclosure relates to thermoformable sheets including monovinylidene aromatic monomers and having multiple layers that are fully recyclable and methods of making the same.

BACKGROUND

Polymers prepared from monovinylidene aromatic monomers, such as styrene, are used in several polymeric systems, including foams, packaging (food packaging), medical, electronic, optical, appliance and automotive applications. Because monovinylidene aromatic monomers are used in so many polymer applications, a significant amount of post-industrial recycled and post-consumer recycled monovinylidene aromatic based polymers are produced. The post-industrial recycled and post-consumer recycled monovinylidene aromatic based polymers have variable qualities, such as degree of crosslinking, gel content, mineral oil content, rubber content and molecular weight. Accordingly, these features can have troublesome effects on one or more properties, such as processability, when reused in another application. New techniques are needed to reuse these monovinylidene aromatic based polymers so that they have excellent environmental stress crack resistance. Some techniques are described in WO2008134131A1, CN107914447A, and EP 2961781. These methods suffer from the feedstocks used containing undesirable amounts of acrylonitrile, conjugated dienes, polyester, and/or methyl methacrylate, which deleteriously affect the recyclability of the composition by requiring many steps to separate the components.

What is needed are thermoformable sheets utilizing post-industrial recycled and/or post-consumer recycled monovinylidene aromatic polymers with excellent environmental stress crack resistance, impact strength, and processability that are fully recyclable.

SUMMARY

Disclosed herein are compositions including a thermoformable sheet having three or more layers including an inner layer, two layers adjacent to the inner layer, and, optionally, a gloss layer on the opposite side of one of the layers adjacent to the inner layer. The two layers adjacent to the inner layer may include one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin, which exhibit resistance to environmental stress cracking wherein at least one of the two layers is an outer layer. The inner layer includes post-consumer recycled monovinylidene aromatic monomer containing polymers which are impact modified by a rubber, post-industrial recycled monovinylidene aromatic monomer containing polymers which are impact modified by a rubber, and optionally, virgin monovinylidene aromatic monomer containing polymers which are impact modified by a rubber.

Disclosed herein are methods of making a thermoformable sheet having three or more layers. The method includes forming a first melt blend of one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin. The method includes forming a second melt blend of post-consumer recycled monovinylidene aromatic monomer containing polymers which are impact modified by a rubber, post-industrial recycled monovinylidene aromatic monomer containing polymers which are impact modified by a rubber, and optionally, virgin monovinylidene aromatic monomer containing polymers which are impact modified by a rubber. The method may include splitting the first melt blend into two streams and separately feeding each of the streams to a multilayer feed block or multilayer manifold. The method includes feeding the second melt blend to the multilayer feed block or multilayer manifold and feeding each layer through a die to form a sheet having three separate layers wherein the second melt stream forms an inner layer disposed between layers formed from the two streams of the first melt blend.

The first melt blend may include the one or more monovinylidene aromatic containing polymers which are impact modified by a rubber. The method may further include feeding into the first melt blend the one or more copolymers of one or more vinylidene aromatic monomers and one or more unsaturated compounds having electrophilic groups at the same time or after forming the first melt blend. The method may further include feeding into the first melt blend a metal salt or a metal oxide at the same time or after forming the first melt blend. The second melt blend may include from about 10 to about 50 percent by weight of postindustrial recycled monovinylidene aromatic monomer containing polymers; from about 10 to about 90 percent by weight of postconsumer recycled monovinylidene aromatic monomer containing polymers; from about 0 to about 40 percent by weight of virgin monovinylidene aromatic monomer containing polymers, wherein the percentages are based on the weight of the layer. The method may further include forming a third melt blend comprising one or more monovinylidene aromatic monomer containing polymers which are impact modified having a particle size below 1.5 microns and a rubber content of from 5 to 15 percent by weight of the polymer feeding the third melt blend to the multilayer feed block or multilayer manifold to form a fourth layer, feeding the fourth layer through the die along with the first three layers to form a sheet having four separate layers wherein the second melt stream forms a layer disposed between layers formed from the two streams of the first melt blend and the third melt blend forms a fourth layer disposed on one of the layers of the first melt blend.

The one or more monovinylidene aromatic containing polymers which are impact modified by a rubber and exhibit resistance to environmental stress cracking may be branched. The one or more monovinylidene aromatic containing polymers which are impact modified by a rubber and exhibit resistance to environmental stress cracking may include one or more copolymers of one or more vinylidene aromatic monomers and one or more unsaturated compounds containing nucleophilic groups and a rubber-modified monovinylidene aromatic polymer including about 90 weight percent or more of a rigid monovinylidene aromatic polymer matrix, based on the total weight of the composition and from about 2 to about 10 weight percent of one or more elastomeric polymers. The one or more copolymers of one or more vinylidene aromatic monomers and one or more unsaturated compounds containing nucleophilic groups may have on average about 0.02 to about 3.0 percent by weight of nucleophilic groups pendant from the copolymer. The copolymer may be chain extended and/or branched by one or more copolymers of one or more vinylidene aromatic monomers and one or more unsaturated compounds having electrophilic groups. The copolymer may optionally have a portion of the chains of the copolymer of one or more vinylidene aromatic monomers and one or more nucleophilic groups crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides. The one or more copolymers of one or more vinylidene aromatic monomers and one or more unsaturated compounds containing nucleophilic groups may have on average about 0.01 to about 15.0 percent by weight of nucleophilic groups pendant from the copolymer and a portion of the chains of the copolymer are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides. The composition may contain a rubber-based impact modifier.

The layer including postconsumer recycled monovinylidene aromatic monomer containing polymers which are impact modified by a rubber, post-industrial recycled monovinylidene aromatic monomer containing polymers which are impact modified by a rubber, and optionally, virgin monovinylidene aromatic monomer containing polymers may include from about 10 to about 50 percent by weight of postindustrial recycled monovinylidene aromatic monomer containing polymers; from about 10 to about 90 percent by weight of postconsumer recycled monovinylidene aromatic monomer containing polymers; and from about 0 to about 40 percent by weight of virgin monovinylidene aromatic monomer containing polymers, and the percentages are based on the weight of the layer. The structure of the composition may contain three layers and the two layers adjacent to the inner layer, based on the first melt blend, may each include from about 5 percent to about 25 percent by weight of the structure and the inner layer, based on the second melt blend, may include 50 to 90 percent by weight based on the weight of the structure. Where a gloss layer is included, the structure may contain four layers including a gloss layer, based on a the third melt blend, which includes about 1 to about 5 percent by weight, the two layers adjacent to the inner layer, based on the first melt blend, each include from about 5 percent to about 25 percent by weight, wherein one layer adjacent to the inner layer is an outer layer and the other layer adjacent to the inner layer is located between the inner layer and the gloss layer, and the inner layer includes 45 to 89 percent by weight based on the weight of the structure.

The rubber impact modifier may be about 5.0 to about 10 percent by weight or greater based on the weight of the copolymer and the impact modifier. The impact modifier may have an average particle size of about 2 to about 15 microns. The composition may include crosslinks with i) ionic bonding of anions formed from the pendant acid groups with a metal cation having a valence of 2 or greater, or ii) complexation between pendant acid groups and metal oxides are reversible and the weight average molecular weight of the copolymer of one or more vinylidene aromatic monomers and one or more unsaturated acids is substantially the same after the crosslinking is reversed as it is before crosslinking. The composition may include a sheet having three layers and an overall thickness of about 3.0 to about 6.0 millimeters wherein the inner layer has a thickness of about 1 mm to about 5 mm; the two layers adjacent to the inner layer have a thickness of about 0.5 mm to about 1.5 mm. The composition may include a sheet having three layers wherein one outer layer is adapted to withstand degradation when exposed to foamed polymer layers and the second outer layer is adapted to withstand degradation when exposed to food. The composition may be in the form of a sheet adapted for use as a refrigerator liner.

Disclosed herein are compositions and methods of making compositions including thermoformable sheets having three or more layers with an elongational viscosity after 3 seconds at 200° C. is 75,000 Pa/s or greater. Disclosed herein are compositions and methods of making compositions including thermoformable sheets having three or more layers which exhibit resistance to environmental stress cracking, wherein the polymers described may have a Mz+1 of about 600,000 to about 2,500,000 and a gel content of 30 or higher. Disclosed herein are compositions and methods of making compositions including thermoformable sheets having three or more layers that are fully recyclable. Disclosed herein are compositions and methods of making compositions including thermoformable sheets having three or more layers that are chiefly composed of high impact monovinylidene aromatics with excellent environmental stress cracking resistance against oils and fat in foods.

BRIEF DESCRIPTION

Figure 2:
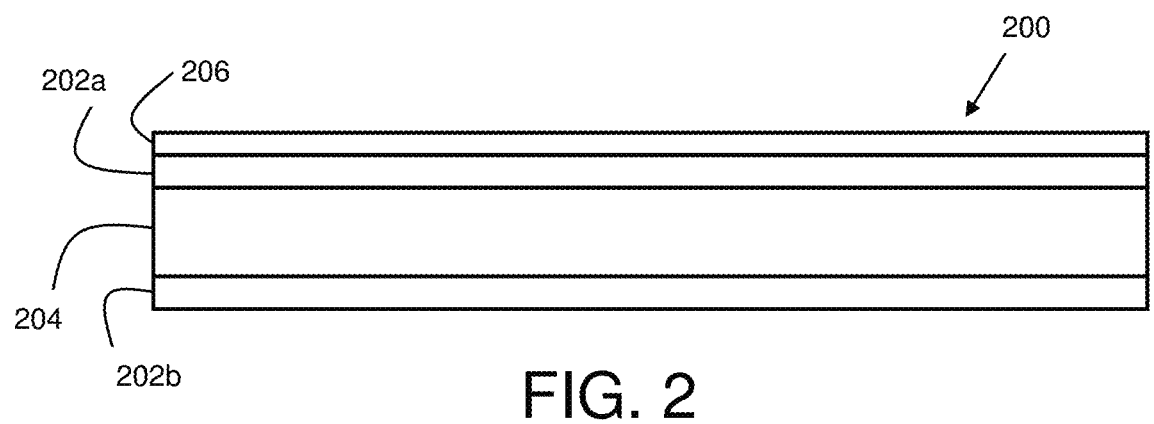
Figure 3:
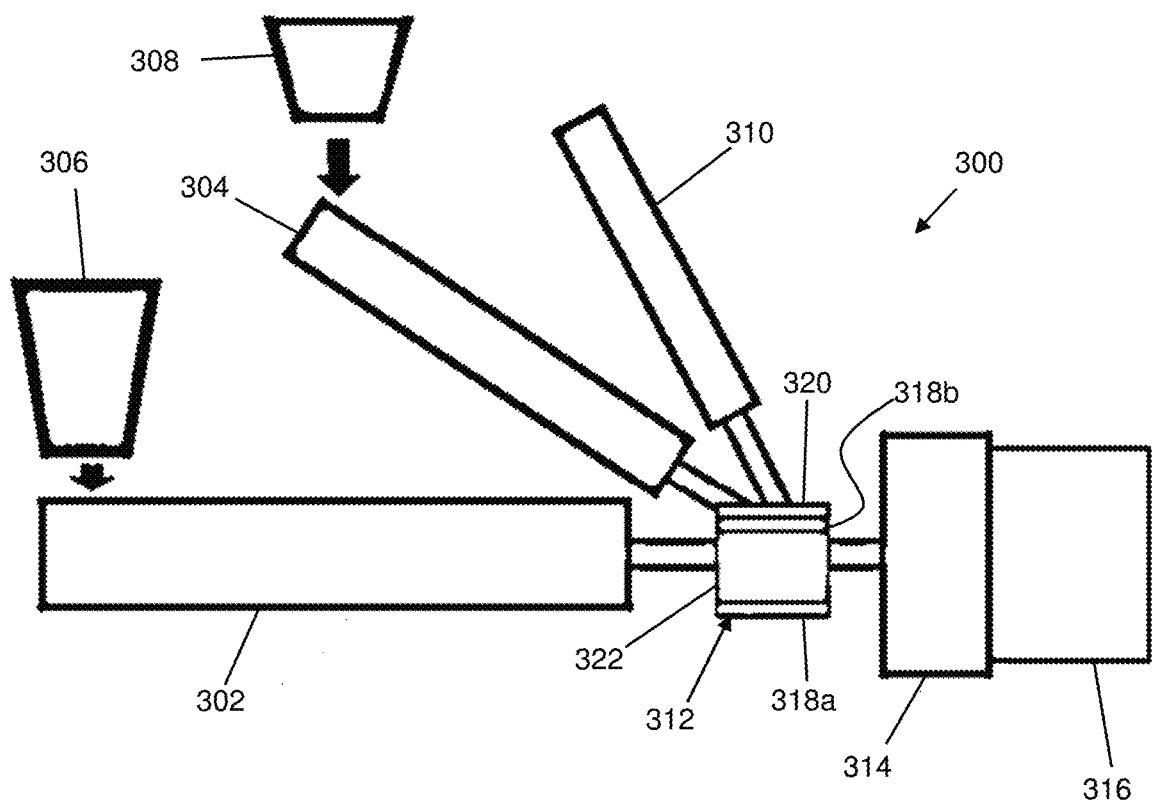
Figure 4:
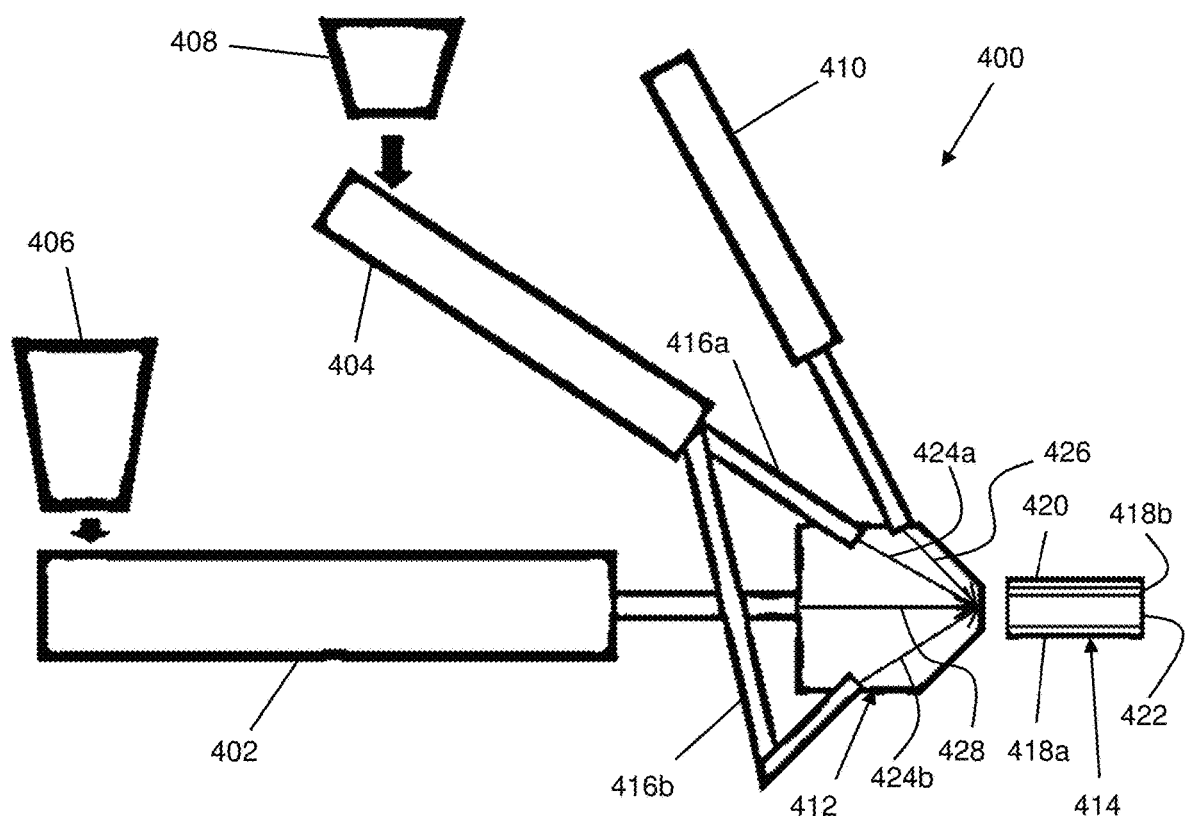
Figure 5:
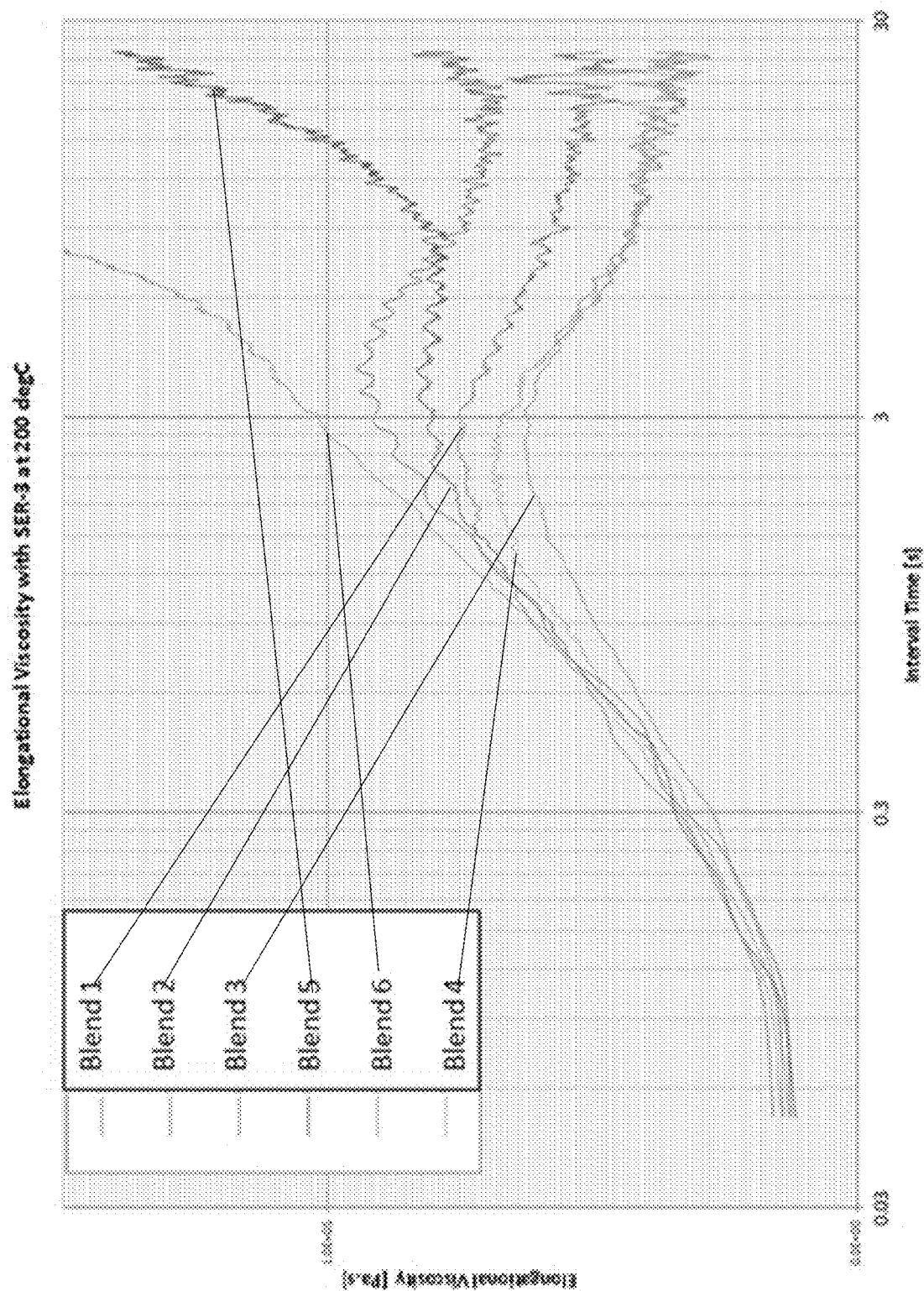
Figure 6:
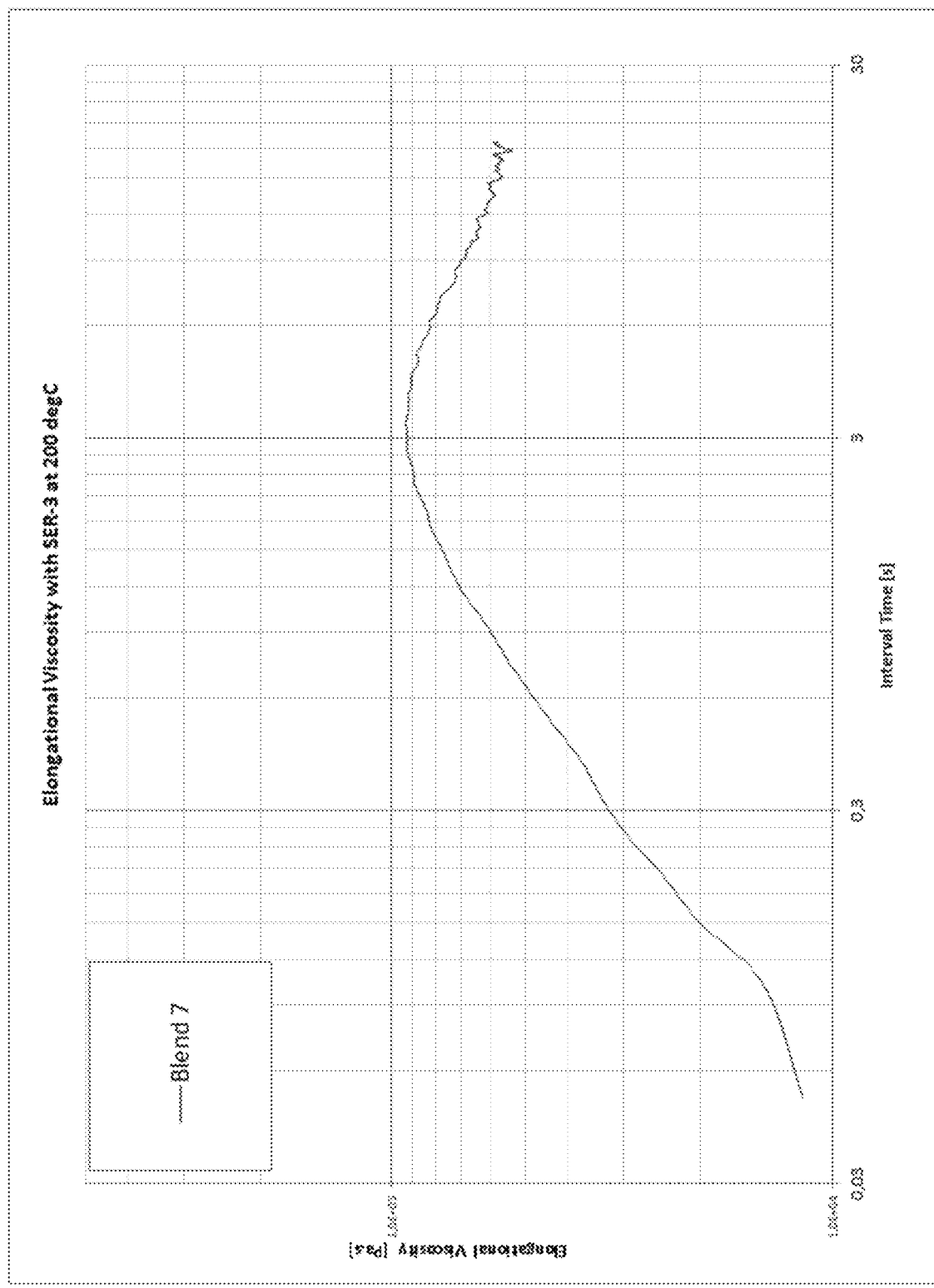
Figure 7:
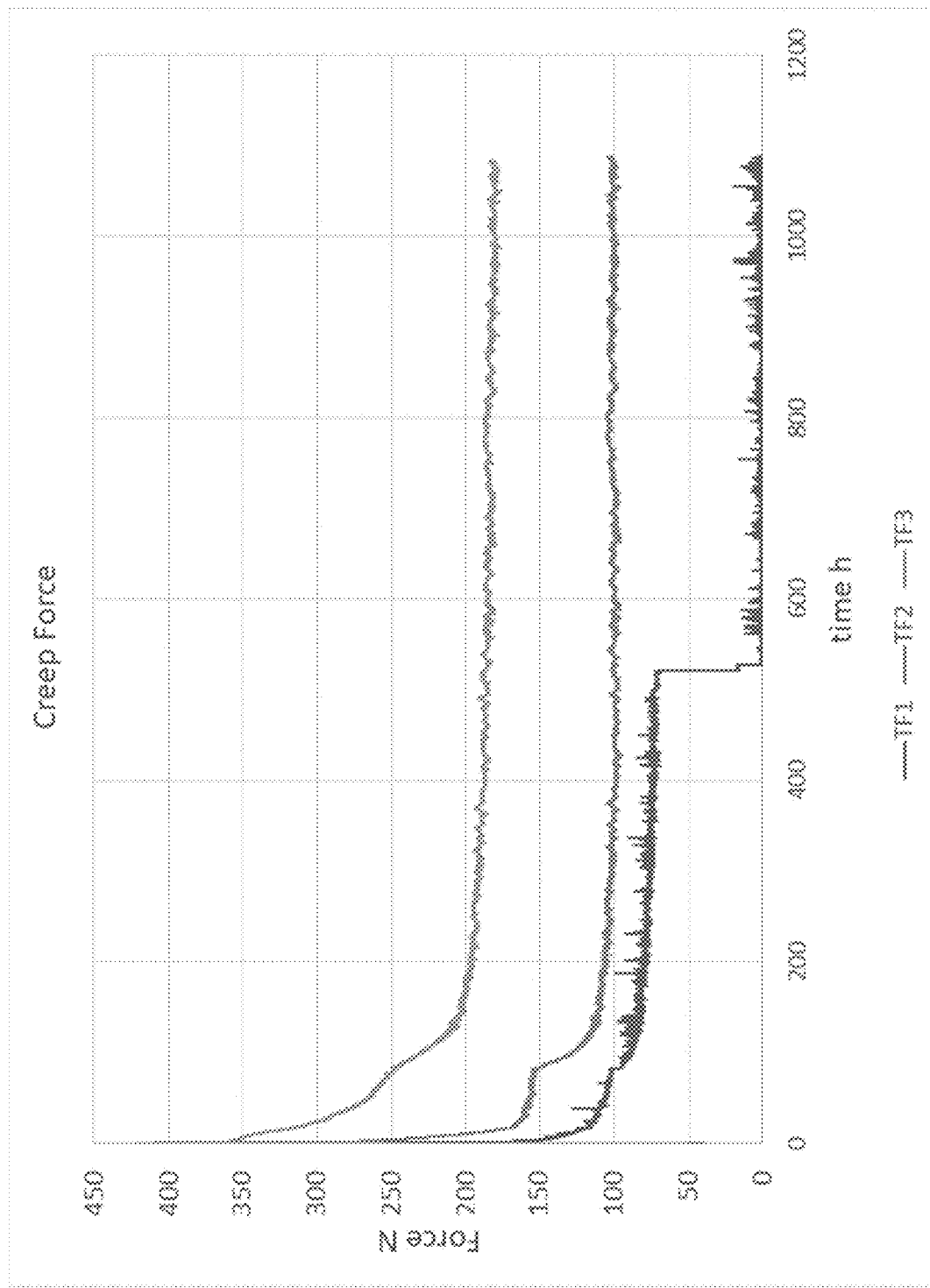

FIG. 1 is a side view of three layer thermoformable sheet.
FIG. 2 is a side view of a four layer thermoformable sheet.
FIG. 3 is a side view of a feed block for making three or four layer thermoformable sheets.
FIG. 4 is a side view of a feed block for making three or four layer thermoformable sheets.
FIG. 5 is a graph showing elongation viscosity over time at 200 degrees Celsius of six different compositions.
FIG. 6 is a graph showing elongation viscosity over time at 200 degrees Celsius of an additional composition.
FIG. 7 is a graph showing the creep force over time on thermoformed extruded mono and multilayer sheet samples under a pre-set strain of 0.35% upon exposure to a food oil.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound. As used herein percent by weight or parts by weight refer to, or are based on, the weight of the compositions unless otherwise specified. Insoluble means that a portion of the polymer composition is no longer soluble as described. Soluble means that the polymer is about 100 percent soluble at the described conditions.

Disclosed herein are multilayer thermoformable sheets having three or more layers. One layer on the outer side of the thermoformable sheet may have excellent environmental stress crack resistances against oils and fats of food. The inner layer may contain high amounts of post-consumer and/or post-industrial monovinylidene aromatic monomer containing polymers which are impact modified by a rubber that, when blended, have very similar viscosity to the other layers of the multilayer thermoformable sheet so that the multilayer thermoformable layer has uniform thickness distribution. The other layer on the outer side of the thermoformable sheet may have excellent environmental stress crack resistance against the blowing agents of a foam composition.

The multilayer thermoformable layer may be about 4 mm to about 10 mm, wherein about 50 percent to about 70 percent of the total thickness is the inner layer, and the overall composition may have uniform thickness across the multilayer thermoformable sheet. The inner layer of the multilayer thermoformable sheet may include from about 10 percent to about 100 percent or about 30 percent to about 80 percent of post-consumer and/or post-industrial monovinylidene aromatic monomer containing polymers which are impact modified by a rubber, and the overall multilayer thermoformable sheet may be fully recyclable post-use. Optionally, the outer layer with environmental stress crack resistance against oils and fats of foods may be a gloss layer that also has excellent environmental stress crack resistance against oils and fats of foods. Optionally, the inner layer may include some virgin monovinylidene aromatic monomer containing polymers which are impacted by a modified rubber so that the inner layer has a similar viscosity as the other layers of the thermoformable sheet.

As one example, FIG. 1 is a side view of three layer thermoformable sheet 100. A top layer 102a and a bottom layer 102b sandwich an inner layer 104 to form the complete thermoformable sheet 100. The top layer 102a has excellent environmental crack stress resistance to oily and/or fatty foods, and the bottom layer 102b has excellent environmental crack stress resistance to blowing agents included in a foam composition. As shown, the inner layer 104 is significantly thicker than the top layer 102a, bottom layer 102b, or both.

As another example, FIG. 2 is a side view of a four layer thermoformable sheet 200. A top layer 202a and a bottom layer 202b sandwich an inner layer 204 to form the complete thermoformable sheet 200. The top layer 202a has excellent environmental crack stress resistance to oily and/or fatty foods, and the bottom layer 202b has excellent environmental crack stress resistance to blowing agents included in a foam composition. In contact with the top layer 202a, a gloss layer 206 is included that has excellent environmental crack stress resistance to oily and/or fatty foods. As shown, the inner layer 204 is significantly thicker than the top layer 202a, bottom layer 202b, the gloss layer 206, or any combination thereof.

The top layer, the bottom layer, or both may function to protect the formed sheet from degradation from one or more oily or fatty foods within a refrigerator. The top layer, the bottom layer, or both may include one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin, which exhibit resistance to environmental stress cracking wherein at least one of the two layers is an outer layer. The top layer and the bottom layer may be the same composition or each may be a different composition. The top layer, the bottom layer, or both may have any thickness sufficient to resist cracking from being in contact with highly acidic, fatty, and/or oily foods and/or in contact with blowing agents of a foam composition. The top layer, the bottom layer, or both may have a thickness of about 0.3 mm or more, about 0.6 mm or more, or about 0.9 mm or more. The top layer, the bottom layer, or both may have thickness of about 1.8 mm or less, about 1.5 mm or less, or about 1.2 mm or less. The top layer, the bottom layer, or both may include about 5 percent or more, about 10 percent or more, or about 15 percent or more of the thermoformable sheet, based on the total weight of the thermoformable sheet. The top layer, the bottom layer, or both may include about 30 percent or less, about 25 percent or less, or about 20 percent or less of the thermoformable sheet, based on the total weight of the thermoformable sheet. The top layer, the bottom layer, or both may contain an amount of post-industrial monovinylidene aromatic monomer sufficient to retain properties sufficient to be in contact with food. The post-industrial monovinylidene aromatic monomer may be present in the top layer, the bottom layer, or both in an amount of about 5 percent or more, about 15 percent or more, or about 30 percent or more, based on the total weight of one of the top layer or the bottom layer. The post-industrial monovinylidene aromatic monomer may be present in an amount of about 5 percent or less, about 30 percent or less, or about 55 percent or less, based on the total weight of one of the top layer or the bottom layer.

The inner layer may function as an insulating layer in a refrigerator. The inner layer may include postconsumer recycled monovinylidene aromatic monomer containing polymers which are impact modified by a rubber, post-industrial recycled monovinylidene aromatic monomer containing polymers which are impact modified by a rubber, and optionally, virgin monovinylidene aromatic monomer containing polymers which are impact modified by a rubber. The inner layer may have a thickness such that the overall multilayer thermoformable sheet contains about 20 percent to about 40 percent post-consumer recycled monovinylidene aromatic monomer containing polymers. The inner layer may have a thickness of about 0.5 mm or more, about 1.5 mm or more, or about 2.5 mm or more. The inner layer may have thickness of about 5.5 mm or less, about 4.5 mm or less, or about 3.5 mm or less. The inner layer may include about 40 percent or more, about 50 percent or more, or about 60 percent or more of the thermoformable sheet, based on the total weight of the thermoformable sheet. The inner layer may include about 90 percent or less, about 80 percent or less, or about 70 percent or less of the thermoformable sheet, based on the total weight of the thermoformable sheet.

The post-industrial and/or post-consumer monovinylidene aromatic monomer containing polymers may contain some impurities that can undesirably impact one or more properties of the composition. The post-industrial and/or post-consumer monovinylidene aromatic monomer containing polymers may be blended with one or more virgin monovinylidene aromatic monomer containing polymers to improve one or more properties of the inner layer. The inner layer may contain an amount of post-industrial and/or post-consumer monovinylidene aromatic monomer containing polymers in any amount sufficient to allow uniform layering of the inner layer with the top layer, the bottom layer, the gloss layer, or a combination thereof. The post-industrial monovinylidene aromatic monomer containing polymers may be present in the inner layer in an amount of about 10 percent or more, about 20 percent or more, or about 30 percent or more, based on the total weight of the inner layer. The post-industrial monovinylidene aromatic monomer containing polymers may be present in an amount of about 90 percent or less, about 70 percent or less, or about 50 percent or less, based on the total weight of the inner layer. The post-consumer monovinylidene aromatic monomer containing polymers may be present in the inner layer in an amount of about 10 percent or more, about 20 percent or more, or about 30 percent or more, based on the total weight of the inner layer. The post-consumer monovinylidene aromatic monomer containing polymers may be present in an amount of about 90 percent or less, about 70 percent or less, or about 50 percent or less, based on the total weight of the inner layer. The combination of post-consumer and post-industrial monovinylidene aromatic monomer containing polymers may be present in the inner layer in an amount of about 20 percent or more, about 40 percent or more, or about 60 percent or more. The combination of post-consumer and post-industrial monovinylidene aromatic monomer containing polymers may be present in an amount of about 100 percent or less, about 90 percent or less, or about 70 percent or less. The virgin monovinylidene aromatic monomer containing polymers may be present in the inner layer in an amount sufficient to improve one or more properties of the thermoformable sheet, such as processability or recyclability. The virgin monovinylidene aromatic monomer containing polymers may be present in the inner layer in an amount of about 0 percent or more, about 10 percent or more, or about 15 percent or more, based on the total weight of the inner layer. The virgin monovinylidene aromatic monomer containing polymers may be present in the inner layer in an amount of about 50 percent or less, about 40 percent or less, or about 30 percent or less, based on the total weight of the inner layer.

The gloss layer may function to protect the multilayer thermoformable sheet from being damaged by one or more oily and/or fatty foods in a refrigerator. The gloss layer may be the same as, substantially similar to, or different than the top layer, the bottom layer, or both (the layers adjacent to the inner layer). The gloss layer may include one or more monovinylidene aromatic monomer containing polymers which are impact modified by a rubber. The rubber in the gloss layer may have a particle size below 1.5 microns. The rubber may be present in the gloss layer in a content amount of about 5 percent or more, about 7 percent or more, or about 9 percent or more, based on the weight of the polymer. The rubber may be present in the gloss layer in a content amount of about 15 percent or less, about 13 percent or less, or about 11 percent or less, based on the weight of the polymer. The gloss layer may have any thickness sufficient to resist cracking from being in contact with highly acidic, fatty, and/or oily foods. The gloss layer may have a thickness of about 0.01 mm or more, about 0.05 mm or more, or about 0.075 mm or more. The gloss layer may have thickness of about 0.175 mm or less, about 0.15 mm or less, or about 0.10 mm or less. The gloss layer may be about 0.5 percent or more, about 1 percent or more, or about 2 percent or more of the thermoformable sheet, based on the total weight of the thermoformable sheet. The gloss layer may be about 5 percent or less, about 4 percent or less, or about 3 percent or less of the thermoformable sheet, based on the total weight of the thermoformable sheet.

The layers of the thermoformable sheets described herein contain monovinylidene substituted aromatic monomers. Monovinylidene aromatic monomers comprise vinylidene, alkenyl groups, bonded directly to aromatic structures. The monovinylidene aromatic monomers may contain one or more aromatic rings, may contain one or two aromatic rings, or may contain one aromatic ring. The aromatic rings can be unsubstituted or substituted with a substituent that does not interfere with polymerization of the monovinylidene aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the monovinylidene aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary monovinylidene aromatic monomers include styrene, alpha methyl styrene, N-phenyl-maleimide and chlorinated styrenes or alpha-methyl styrene and styrene. The monovinylidene aromatic monomers may be monovinylidene aromatic monomers, which contain one unsaturated group. Monovinylidene aromatic monomers include but are not limited to those described in U.S. Pat. Nos. 4,666,987; 4,572,819 and 4,585,825, which are herein incorporated by reference. The monomer may correspond to the formula:

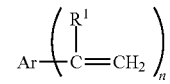

wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The monovinylidene aromatic monomers may be present in the copolymers in a sufficient amount such that the polymer exhibits the advantageous properties associated with polymers of monovinylidene aromatic monomers, for instance polystyrene. The advantageous properties of polymers of monovinylidene monomers include processability, stiffness, and thermal stability. The copolymers of one or more monovinylidene aromatic monomers and one or more unsaturated compounds containing a nucleophilic group may contain monovinylidene aromatic monomers in an amount of about 90 percent by weight of the copolymers or greater, about 95 percent by weight or greater or about 96 percent by weight or greater. The copolymers of one or more monovinylidene aromatic monomers and one or more unsaturated compounds containing a nucleophilic group may contain monovinylidene aromatic monomers in an amount of about 99.98 percent by weight of the polymerizable compositions or copolymers or less, about 99.97 percent by weight or less or about 99.96 percent by weight or less. The copolymers one or more copolymers of one or more monovinylidene aromatic monomers and one or more unsaturated compounds having electrophilic groups may contain monovinylidene aromatic monomers in an amount of about 40 percent by weight of the polymerizable compositions or copolymers or greater, about 50 percent by weight or greater or about 60 percent by weight or greater. The one or more copolymers of one or more monovinylidene aromatic monomers and one or more unsaturated compounds having electrophilic groups may contain monovinylidene aromatic monomers in an amount of about 90 percent by weight of the polymerizable compositions or copolymers or less, about 85 percent by weight or less or about 80 percent by weight or less. The recited amounts may relate to the amounts of monovinylidene aromatic monomers.

The top layer, the bottom layer, or both may include the monovinylidene aromatic monomer containing polymers which are impact modified by a rubber and exhibit resistance to environmental stress cracking wherein at least one of the two layers is an outer layer. The monovinylidene aromatic monomer containing polymers which are impact modified by a rubber and exhibit resistance to environmental stress cracking may be branched polymers. The branching may be sufficient to provide a polymer which exhibits the properties of the thermoformed articles as disclosed herein. If the degree of branching is too low, they do not provide the elongational viscosity and chemical resistance properties, which are desired for the disclosed applications. If the degree of branching is too high, the elongational viscosity may be so high that the desired structures cannot be formed. The degree of branching impacts the Mz+1, which is in direct relation to the degree of branching. The polymers with the Mz+1 disclosed herein have an appropriate degree of branching.

The polymer may be one or more copolymers of one or more vinylidene aromatic monomers and one or more unsaturated compounds containing nucleophilic groups and a rubber modified monovinyl aromatic polymer. The copolymer may have nucleophilic groups pendant from the copolymer. The copolymer may be chain extended and/or branched by one or more copolymers of one or more vinylidene aromatic monomers and one or more unsaturated compounds having electrophilic groups. A portion of the chains of the copolymer of one or more vinylidene aromatic monomers and one or more nucleophilic groups may be crosslinked with other chains of the copolymer of one or more vinylidene aromatic monomers and one or more nucleophilic groups by i) ionic bonding of anions formed from the pendant nucleophilic groups with a metal cation having a valence of 2 or greater; or ii) complexation between pendant acid groups and metal oxides.

Chain-extended as used herein means that two or more of the subject copolymers are linked by another copolymer to form linear segments of the subject copolymers. The subject copolymers may be one or more copolymers of one or more vinylidene aromatic monomers and one or more unsaturated compounds containing a nucleophilic group. The linking copolymer may be one or more copolymers of one or more vinylidene aromatic monomers and one or more unsaturated compounds having electrophilic groups. Branched as used herein means that more than two of the subject copolymers are linked by another copolymer such that the subject polymers are formed having three or more connected chains that are not linear and form non-linear branches. The compositions disclosed may include polymer chains wherein a portion of the subject polymers are chain extended and a portion of the subject polymers are branched by the linking polymers.

Crosslinked as used herein means that a plurality of the subject copolymers are linked to other subject copolymers through ionic bonds of anions formed from the acid groups from the unsaturated acid with cations formed from the metals or by complexes of from the acid groups from the unsaturated acid with metal oxides wherein the metal salts and metal oxides that have at least two valences. Valence with respect to the metals means that the metals can form two cationic species that form bonds with anions or can complex with at least two acids. The subject copolymers may be one or more copolymers of one or more vinylidene aromatic monomers and one or more unsaturated compounds containing a nucleophilic group. A number of the subject copolymers may have two or more bonds to other subject copolymers. The number of the subject copolymers may have two or more bonds to other subject copolymers and overall crosslinks are chosen to provide the advantageous properties disclosed herein. As used herein un-crosslinked means that the subject polymers do not have multiple crosslinks such that the resulting polymer composition becomes insoluble in solvents, for instance methylene chloride at 23°. Insoluble means that a portion of the polymer composition is no longer soluble as described. Soluble means that the polymer is about 100 percent soluble at the described conditions.

There are several commercially available copolymers of one or more monovinylidene aromatic monomers and one or more unsaturated compounds having electrophilic groups having relatively high concentrations of electrophilic groups. When these copolymers are used to chain extend and or branch copolymers of one or more monovinylidene aromatic monomers and one or more unsaturated compounds containing nucleophilic groups, the concentration of the nucleophilic groups on the copolymer may be relatively low. The concentration of the nucleophilic groups on the one or more copolymers of one or more monovinylidene aromatic monomers and one or more unsaturated compounds containing a nucleophilic group are chosen such that based on the concentration of electrophilic groups on the branched by one or more copolymers of one or more monovinylidene aromatic monomers and one or more unsaturated compounds having electrophilic groups when the copolymers are reacted chain extended and or branched, un-crosslinked polymers are prepared. The concentration of the nucleophilic groups on the one or more copolymers of one or more monovinylidene aromatic monomers and one or more unsaturated compounds containing a nucleophilic groups may be about 0.01 percent by weight of the copolymer or greater, about 0.02 percent by weight of the copolymer or greater, about 0.04 percent by weight or greater about 0.05 percent by weight or greater, about 0.1 percent by weight or greater or about 0.2 percent by weight or greater. The concentration of the nucleophilic groups on the one or more copolymers of one or more monovinylidene aromatic monomers and one or more unsaturated compounds containing nucleophilic groups may be about 15 percent by weight of the copolymer or less, about 10 percent by weight or less, about 5 percent by weight or less, about 3.0 percent by weight of the copolymer or less, about 1.5 percent by weight or less or about 0.5 percent by weight or less.

The concentration of the electrophilic groups on the one or more copolymers of one or more monovinylidene aromatic monomers and one or more unsaturated compounds containing electrophilic groups are chosen such that based on the concentration of nucleophilic groups on the one or more copolymers of one or more vinylidene aromatic monomers and one or more unsaturated compounds having nucleophilic groups when the copolymers are reacted chain extended and or branched, un-crosslinked polymers are prepared. The concentration of the electrophilic groups on the one or more copolymers of one or more monovinylidene aromatic monomers and one or more unsaturated compounds containing a electrophilic group may be about 10 percent by weight of the copolymer or greater, about 15 percent by weight or greater or about 20 percent by weight or greater. The concentration of the electrophilic groups on the one or more copolymers of one or more vinylidene aromatic monomers and one or more unsaturated compounds containing an electrophilic group may be about 60 percent by weight of the copolymer, about 50 percent by weight or less or about 40 percent by weight or less.

The polymers which are crosslinked are based on one or more copolymers of one or more monovinylidene aromatic monomers and one or more unsaturated compounds containing one or more nucleophilic groups or such copolymers chain extended by the one or more copolymers of one or more monovinylidene aromatic monomers and one or more unsaturated compounds containing a electrophilic group. The copolymers are prepared such that the concentration of nucleophilic groups is selected such that when reacted with one or more metal salts or metal oxides the copolymers are crosslinked to provide the advantageous properties described herein.

The concentration of the nucleophilic groups on the one or more copolymers of one or more monovinylidene aromatic monomers and one or more unsaturated compounds containing nucleophilic groups is chosen such that based on the concentration of metal salts or metal oxides which are to be reacted with the copolymers crosslinked polymers are prepared. The equivalents ratio of metal salts to the nucleophilic groups on the copolymers of one or more monovinylidene aromatic monomers and one or more unsaturated compounds containing nucleophilic groups is chosen such that when the components are reacted crosslinked polymers are prepared. Equivalents as used in this context means the number of nucleophilic groups available to react with the metals. To form the crosslinked polymers anions based on the nucleophilic groups react with the cations formed from the metal salts that have valences of two or greater or the acids complex with metal oxides. The extent of reaction and crosslinking is controlled by the amount of the lowest amount of the nucleophilic groups or metal oxide or metal salts present. The amount of nucleophilic groups may be the limiting reactive group. The amount of metal salts or metal oxides groups may be the limiting reactive group. The equivalents ratio of metal salts or metal oxides to nucleophilic groups may be about 1:40 or greater, about 1:20 or greater or 1:10 or greater. The equivalents ratio of metal salts or metal oxides to nucleophilic groups may be about 40:1 or less, about 20:1 or less or 10:1 or less.

The one or more copolymers of one or more monovinylidene aromatic monomers and one or more unsaturated compounds containing nucleophilic groups may be both chain extended and/or branched and crosslinked. Chain extending with the one or more copolymers of one or more monovinylidene aromatic monomers and one or more unsaturated compounds containing electrophilic groups and crosslinking using metal salts or oxides may be performed simultaneously or in any sequence. If performed in sequence a sufficient amount of nucleophilic groups should remain after the first step to perform the second step. If performed simultaneously then the equivalents of metal salt or metal oxide and the electrophilic groups present should be chosen to allow both reactions to proceed.

The compositions may contain branching agents commonly used in monovinylidene aromatic based polymers. The branching agents may be monovinylidene substituted aromatic monomers having 2 or more vinylidene groups. Other branching agents may include other difunctional and in general multifunctional (functionality>2) monomers, multifunctional initiators and multifunctional chain transfer agents and the like. The branching agents may be present in polymerizable compositions in an amount of about 0.001 percent by weight of the composition or greater, about 0.002 percent by weight or greater or about 0.003 percent by weight or greater. The branching agents may be present in polymerizable compositions in an amount of about 0.5 percent by weight of the composition or less, about 0.2 percent by weight or less or about 0.1 percent by weight or less.

The one or more unsaturated compounds and/or the one or more monovinylidene aromatic monomers may contain one or more nucleophilic groups. The copolymers may contain more than one different nucleophilic group or may contain only one species of nucleophilic group. The copolymers may be prepared from more than one unsaturated compound each containing different type of nucleophilic group. The copolymers may be prepared from one species of unsaturated compounds each containing the same nucleophilic group. The nucleophilic groups may be pendant from the chain of the copolymer. The one or more unsaturated compounds containing nucleophilic groups may contain any nucleophilic group that reacts with an electrophilic group under the conditions described herein and/or a metal salt or oxide or cation formed therefrom. Nucleophilic group as used herein is a group which donates an electron pair to make a covalent bond. Exemplary nucleophilic groups include carboxylic acid, alcohol, phenol, amine, aniline, imidazole, tetrazole, thiol, boronic acid, glycol, hydrazine and hydroxyl amine groups. The one or more nucleophilic groups may be acids including carboxylic acids, unsaturated aromatic acids, sulfonic acids, phosphorous based acids, boronic acids, or mixtures thereof. Nucleophilic groups may be carboxylic acid groups. The one or more unsaturated compounds containing nucleophilic groups may be (meth)acrylic acids, (meth)acrylates, hydroxyalkyl methacrylates, and the like. The one or more unsaturated compounds containing nucleophilic groups may be methacrylic acid and or acrylic acid.

The one or more unsaturated compounds containing electrophilic groups may contain any electrophilic group that reacts with a nucleophilic group under the conditions described herein. Electrophilic group as used herein is a group which receives an electron pair to form a covalent bond. Exemplary electrophilic groups include epoxide, anhydride, imide, ester, acyl halide, acyl nitrile, aldehyde, ketone, isocyanate and isothiocyanate groups. Electrophilic groups may be epoxide groups. The one or more unsaturated compounds containing electrophilic groups may be glycidyl (meth)acrylates, and the like.

The copolymers disclosed herein may further comprise one or more (meth)acrylates. (Meth)acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

wherein $R^a$ is separately in each occurrence H or —$CH_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl (meth)(acrylate) and hexyl (meth)acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The copolymers disclosed herein contain (meth)acrylates in an amount of about 0 percent by weight of the copolymers or greater, about 1 percent by weight or greater or about 2 percent by weight or greater. The polymerizable compositions and copolymers disclosed herein contain (meth)acrylates in an amount of about 20 percent by weight of the copolymers or less, about 15 percent by weight or less, about 10 percent by weight or less, about 8 percent by weight or less or about 5 percent by weight or less.

The copolymers may further comprise one or more unsaturated nitriles. An unsaturated compound may be described as an unsaturated nitrile. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the copolymers to enhance the glass transition temperature, transparency, chemical resistance and the like. The copolymers disclosed herein may contain one or more unsaturated nitriles in an amount of about 0 percent by weight of the copolymers or greater, about 1 percent by weight or greater or about 2 percent by weight or greater. The copolymers disclosed herein may contain one or more unsaturated nitriles in an amount of about 40 percent by weight of the copolymers or less, about 35 percent by weight or less, about 30 percent by weight or less or about 20 percent by weight or less.

Other vinyl monomers may also be included in the copolymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like. These additional comonomers can be incorporated into the composition in several ways including, interpolymerization with the vinylidene substituted aromatic containing copolymer and/or polymerization into polymeric components which can be combined, for example blended into the matrix. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The monovinylidene aromatic monomers, whether virgin, post-industrial, and/or post-consumer, or any other monomer, polymer, or composition disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are inter-polymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions disclosed herein contain the copolymer in an amount of about 0.5 percent by weight of the compositions or greater or 50 percent by weight of the compositions or greater. The compositions disclosed herein contain copolymer in an amount of about 99.5 percent by weight of the compositions or less, 90 percent by weight of the compositions or less, 80 percent by weight of the compositions or less or 50 percent by weight of the compositions or less. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the total weight of the compound or composition containing rubbers.

The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01 by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (μm), equal to or greater than about 0.1 micrometers, and about 0.5 micrometers. The average particle size of the rubber particles may be equal to or less than about 15 micrometers, equal to or less than about 10 micrometers, equal to or less than about 7 micrometers, or equal to or less than about 4 micrometers.

The disclosed compositions may also optionally contain one or more additives that are commonly used in compositions of this type or to make compositions of this type. Such additives of this type include, but are not limited to: ignition resistant additives, stabilizers, colorants, antioxidants, antistats, silicon oils, flow enhancers, mold releases, chain transfer agents, branching agents, a radical initiator, etc. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof.

If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

The chain extended and/or branched polymers may be prepared in the presence of a metal salt or metal oxide to facilitate the reaction. The crosslinked polymers may be formed by contact with metal salts or metal oxides. The same metal oxides may be used for both reactions, whether performed separately or in sequence. The one or more metal salts and/or metal oxides include metals having a valence of 2 or greater. The metal may be any metal that is capable of forming 2 or more cationic groups that will form an ionic bond with anions formed from the nucleophilic group of the copolymer or complexing with two nucleophilic groups and/or facilitate the reaction of nucleophilic groups with electrophilic groups to form chain extended and/or branched copolymers. The metal salt may reduce the temperature at which the chain extended and or branched copolymers may be formed. The metal salt may function as a catalyst for the formation of the chain extended and or branched copolymers. Any metal salt that catalyzes or reduces the temperature required for formation of the chain extended and or branched copolymers may be utilized. The metal salt may be the salt of a transition metal, an alkali metal, an alkaline earth metal, a post transition metal or a metalloid. The metal in the salt may be zinc, zirconium, aluminum, calcium, sodium, copper, magnesium or mixtures thereof. The metal in the salt may be zinc. The metal may form a salt with an acetate, carbonate, bicarbonate, methacrylate, fumarate counter ion, or mixtures thereof. The metal may form a salt with an acetate counter ion. The metal salt may be zinc acetate, zinc acetate dihydrate, zinc carbonate, and the like.

The metal salt may be present in a sufficient amount to catalyze or reduce the temperature required for formation of the chain extended and or branched copolymers. The metal salt may be present in the reactive composition disclosed in a mole ratio relative to the one or more vinylidene aromatic monomers and one or more unsaturated compounds containing a nucleophilic group of about 20:1 to about 1:20, about 10:1 to about 10:1 or about 5:1 to about 1:5. The metal salt may be present in the reactive composition in an amount of about 10 ppm or greater based on the weight of the composition, about 50 ppm by weight or greater or about 100 ppm or greater. The metal salt may be present in the reactive composition in an amount of about 5000 ppm by weight or less based on the weight of the composition, about 3000 ppm by weight or less or about 1000 ppm by weight or less. The metal is used in the form of a salt or oxide. Any salt or oxide may be used which can form cations under reaction conditions for the formation of the crosslinked polymers. The metal may be present in the form of a metal carbonate, metal acetate, metal bicarbonate, metal oxide, metal hydroxide, metal carboxylate, metal acetylacetonate, metal salt of a fatty acid or mixtures thereof. Exemplary metal salts or metal oxides include zinc acetate, zinc oxide, zinc carbonate, zinc hydroxide, zinc stearate, zinc citrate, zirconium acetate, zirconium oxide, aluminum acetate, calcium carbonate, calcium stearate and the like. The metal salt or metal oxide may be present in the reactive composition for forming the crosslinked copolymers in the ratios disclosed hereinbefore. The metal salt or metal oxide may be present in the reactive composition is a sufficient amount to form the crosslinked copolymer. The metal salt or metal oxide may be present in a matrix of a polymer of one or more vinylidene aromatic monomers which can be blended with the copolymer.

The one or more copolymers of one or more vinylidene aromatic monomers and one or more unsaturated compounds containing a nucleophilic group may be present in the reactive composition in an amount of about 85 weight percent or greater based on the weight or the reactive composition, about 90 weight percent or greater, about 95 weight percent or greater, or about 99 weight percent or greater. The one or more copolymers of one or more vinylidene aromatic monomers and one or more unsaturated compounds containing a nucleophilic group may be present in the reactive composition in an amount of about 99.9 weight percent or less based on the weight or the reactive composition, about 99.8 weight percent or less or about 99.7 weight percent or less. The one or more copolymers of one or more vinylidene aromatic monomers and one or more unsaturated compounds containing an electrophilic group may be present in the reactive composition in an amount of about 0.05 weight percent or greater based on the weight or the reactive composition, about 0.1 weight percent or greater or about 0.3 weight percent or greater. The one or more copolymers of one or more vinylidene aromatic monomers and one or more unsaturated compounds containing an electrophilic group may be present in the reactive composition in an amount of about 10 weight percent or less based on the weight or the reactive composition, about 8 weight percent or less or about 5 weight percent or less.

The reactants may be contacted using any method wherein chain extended and or branched copolymers of one or more vinylidene aromatic monomers and one or more unsaturated compounds containing nucleophilic groups or crosslinked polymers are prepared. Exemplary methods include melt blending, extrusion, injection molding, foam extrusion, sheet extrusion, and the like. Exemplary methods include melt blending. The temperature for reacting the reactants is selected such that chain extended and or branched copolymers of one or more vinylidene aromatic monomers and one or more unsaturated compounds containing nucleophilic groups are prepared. The reactants may be contacted at a temperature of about 200° C. or greater, or about 220° C. or greater, or about 230° C. or greater. The reactants may be contacted at a temperature of about 260° C. or less, or about 250° C. or less, or about 245° C. or less. The contacting time at the stated temperatures is selected such that chain extended and or branched copolymers of one or more vinylidene aromatic monomers and one or more unsaturated compounds containing nucleophilic groups are prepared. The contacting time of the reactants may be about 0.5 minutes or greater, about 0.6 minutes or greater or about 0.7 minutes or greater. The contacting time of the reactants may be about 10 minutes or less, about 5.0 minutes or less or about 3.0 minutes or less. The reactants may be melt blended in an extruder, mixer, and the like. To facilitate formation of the chain extended and or branched copolymers of one or more vinylidene aromatic monomers and one or more unsaturated compounds containing nucleophilic groups it may be desirable to react the reactants at the specific energy values. The copolymers may be reacted under conditions such that the specific energy values are greater than 400 J/g or 700 J/g.

The reactants may be contacted using any method wherein crosslinked copolymers of one or more vinylidene aromatic monomers and one or more unsaturated compounds containing one or more nucleophilic groups are prepared. Exemplary methods include melt blending, extrusion, injection molding, foam extrusion, sheet extrusion, and the like. Exemplary methods include melt blending. The temperature for reacting the reactants is selected such that crosslinked copolymers of one or more vinylidene aromatic monomers and one or more unsaturated compounds containing one or more acid groups are prepared. The reactants may be contacted at a temperature of about 180° C. or greater, or about 200° C. or greater, or about 220° C. or greater. The reactants may be contacted at a temperature of about 260° C. or less, or about 250° C. or less, or about 245° C. or less. The contacting time at the stated temperatures is selected such that crosslinked copolymers of one or more vinylidene aromatic monomers and one or more unsaturated compounds containing one or more acid groups are prepared. The contacting time of the reactants may be about 0.1 minutes or greater, about 0.3 minutes or greater or about 0.5 minutes or greater. The contacting time of the reactants may be about 10 minutes or less, about 5.0 minutes or less or about 3.0 minutes or less. Acids may be generated in the process. Any acids present in the reactor may be removed to drive the reaction to completion. Removal of the acids may be performed by any known method. The reactants may be melt blended in an extruder, mixer, and the like. The final form of the products can be pellets, foam boards, sheets, thermoformed articles, injection molded articles, compression molded articles The crosslinks are reversible. The crosslinks may be reversed before the copolymers are used to facilitate processability. The crosslinks may be reversed by subjecting the crosslinked copolymers to a temperature at which the ionic bonds are broken under shear and/or contacting the composition with excess equivalents of an acid with respect to the crosslinked acid groups such that the crosslinks are reversed. The temperature that the crosslinked copolymer may be exposed to break the crosslinks is any temperature at which the crosslinks are broken or reversed. The copolymers may be exposed to a temperature to break the crosslinks of about 180° C. or greater, or about 190° C. or greater, or about 200° C. or greater.

The copolymers may be exposed to a temperature to break the crosslinks at a temperature of about 260° C. or less, or about 255° C. or less or about 250° C. or less. The contacting time at the stated temperatures is selected such that the crosslinks of the copolymers of one or more vinylidene aromatic monomers and one or more unsaturated compounds containing one or more nucleophilic groups with metal salts or metal oxides are broken. The contacting time of the reactants may be about 0.1 minutes or greater, about 0.2 minutes or greater or about 0.3 minutes or greater. The contacting time of the reactants may be about 5 minutes or less, about 4 minutes or less or about 3 minutes or less. The contacting may take place under shear. Shear may be induced in an extruder, mixer or injection molding equipment.

Alternatively, the crosslinks may be reversed by contacting the crosslinked co-polymer with an acid that causes the crosslinks to break. Exemplary classes of acids include acetic acid, a carboxylic acid corresponding to the formula $CH_3(CH_2)COOH$ wherein n is separately in each occurrence from 1 to 20, TFA triflouro acetic acid, or mixtures thereof. Exemplary acids include acetic acid. Any ratio of acid to the crosslinked copolymer which causes the crosslinks to be broken may be used. The equivalents ratio of acids to the crosslinked anions of the acid groups is about 1:1 or greater, about 5:1 or greater or about 10:1 or greater. The equivalents ratio of acids to the crosslinked anions of the acid groups is about 10000:1 or less, about 5000:1 or less or about 4000:1 or less. The process is performed until the solution viscosity of the copolymer of one or more vinylidene aromatic monomers and one or more unsaturated acids is substantially the same after the crosslinking is reversed as it is before crosslinking. Substantially the same means the solution viscosity of the copolymer that has undergone reversal of crosslinking is within 5 percent of the original molecular weight or within 1 percent of the original molecular weight.

Disclosed are various techniques for producing the copolymers. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed When a desirable monomer conversion level and a matrix copolymer of desired molecular weight distribution is obtained, where rubber is present, the polymerization mixture may then be subjected to conditions sufficient to crosslink the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer. The pellets may be fed into any device or hardware disclosed herein that facilitates formation of a thermoformable sheet.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. Generally, conversion (also sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co) polymer) to the weight of the reaction mixture (for example, unpolymerized monomer(s)) expressed in percent at any specified time during the polymerization reaction.

To synthesize rubber-modified copolymers with high performance by the mass process, four aspects are important among many others. These aspects are grafting of the rubber substrate prior to phase inversion, rubbery domain and/or particle formation or sizing during phase inversion, building molecular weight and molecular weight distribution of the matrix, and cross-linking of the rubber particle at the completion point of the mass polymerization. Alternatively, a combination of mass and suspension polymerization techniques are employed. Using these techniques, following phase inversion and subsequent size stabilization of the rubber particles, the partially polymerized product can be suspended with or without additional monomers in an aqueous medium which contains a polymerized initiator and polymerization subsequently completed. The rubber-modified copolymer is subsequently separated from the aqueous medium by acidification, centrifugation or filtration. The recovered product is then washed with water and dried.

Disclosed are structures comprising a sheet having a polymeric layer comprising a composition as disclosed herein. The sheet may have more than one layer and one of the outer most layers may comprise a composition as disclosed herein. The sheet may have three of more layers and one or both of the outer most layers comprises a composition as disclosed herein. The sheets may be formed using by extrusion or multilayer extrusion. Exemplary extrusion and multilayer extrusion process are disclosed in US20110274900A1 or U.S. Pat. No. 10,018,406B2 known references, incorporated herein by reference in their entirety. The sheets may be used as refrigerator liners. Refrigerator liners may be formed by thermoforming the sheets to make the final shape for use in refrigerator liners, processes for thermoforming are disclosed in U.S. Pat. No. 5,716,581A or U.S. Pat. No. 10,018,406B2, incorporated herein by reference in their entirety. Refrigerator liners prepared using the compositions disclosed herein can contain significant amount of recycled content as a result of the use of these compositions.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The weight average molecular weight of the copolymer may be about 100,000 g/Mole or greater, about 120,000 g/Mole or greater or about 140,000 g/Mole or greater. The weight average molecular weight of the copolymer may be about 400,000 g/Mole or less, about 350,000 g/Mole or less or about 325,000 g/Mole or less. Molecular weight is determined by gel permeation chromatography using polystyrene standards. Polymer molecular weights may be measured by gel permeation chromatography (GPC) using narrow molecular weight polystyrene standards and tetrahydrofuran (THF) as solvent, standard integrating software issued together with a UV-detector. All molecular weights are determined by GPC, by the same analysis (Mw, Mn, MWD, Mz, Mz+1, etc), molecular weights may be reported in units of g/mole or Dalton wherein 1 Dalton is equal to 1 g/mole. Unlike small molecules, the molecular weight of a polymer is generally not one unique value. Rather, a given polymer will have a molecular weight distribution (MWD). The distribution generally will depend on the way the polymer is produced. For polymers the distribution of molecular weight is a function P(Mi), where P(Mi) is the probability, or fraction of molecules having a molecular weight Mi. As used herein, molecular weight distribution describes the distribution of the molecular weight of a polymer. The molecular weight of the monovinylidene aromatic polymer, refers to the molecular weight of the soluble fraction of the matrix. The molecular weight may be measured using gel permeation chromatography. Different solvents can be used, and a typical solvent is tetrahydrofuran. Polystyrene standards may be used for calibration. The average molecular weight may be characterized by the number average molecular weight (i.e., Mn), the weight average molecular weight (i.e., Mw), the z-average molecular weight (i.e., Mz), Z+1 average molecular weight (i.e., Mz+1), or any combination thereof. The polydispersity index is defined as the ratio of the weight average molecular weight, Mw, and the number average weight, Mn. Such molecular weights are determined as disclosed herein.

In the present disclosure, the polymers of containing one or more monovinylidene aromatic monomers may have a weight average Mw of about 150,000 g/Mole or more, about 200,000 g/Mole or more, or about 250,000 g/Mole or more. The polymers containing one or more monovinylidene aromatic monomers may have a Mw of about 400,000 g/Mole or less, about 350,000 g/Mole or less, or about 300,000 g/Mole or less. After branching, crosslinking, or both, the monovinylidene aromatic monomer containing polymers may have a Mz+1 of about 450,000 g/Mole or more, about 600,000 g/Mole or more, about 650,000 g/Mole or more, about 700,000 g/Mole or more, about g/Mole 850,000 or more, about 1,000,000 or more, or about 1,400,000 or more. After branching, crosslinking, or both, the polymers may have a Mz+1 of about 2,500,000 or less, about 2,100,000 or less, or about 1,800,000 or less. about 1,500,000 g/Mole or less, about 1,300,000 g/Mole or less, or about 1,050,000 g/Mole or less. In this disclosure, the polydispersity index may be about 2.5 or more.

As one example of forming a three or four layer thermoformable sheet, FIG. 3 is a side view of a feed block for making three or four layer thermoformable sheets 316. The hardware 300 includes a main extruder 302 and a co-extruder 304 that in combination form the beginnings of a multilayer thermoformable sheet. In either order, components are added to a hopper 306 of the main extruder 302 to form a first melt blend, and components are added a hopper 308 of the co-extruder 304 to form a second melt blend. The components may include any component, monomer, additive, rubber, copolymer, or polymer described herein, including any type of monovinylidene aromatic monomers described herein. The main extruder 302 feeds the first melt blend into a multilayer feed block 312 to form an inner layer 322 of the thermoformable sheet 316. The co-extruder 404 splits the second melt blend into the multilayer feed block 312 by parsing the second melt blend into the co-extruder 304 pushes the second melt blend into the multilayer feed block 312 which spilt the second melt into 2 streams and subsequently layers one stream as top layer 318b and the other stream as bottom layer 318a. Over the top layer 318b, another co-extruder 310 feeds a third melt blend into the multilayer feed block 312 to form a gloss layer 320 of the thermoformable sheet 316. Subsequently, the top layer 318b, the bottom layer 318a, the inner layer 322, and the gloss layer 320 of the multilayer feed block 312 are fed into a dye 314 that extrudes the thermoformable sheet 316.

As another example of forming a three or four layer thermoformable sheet, FIG. 4 is a side view of a multi manifold die for making three or four layer thermoformable sheets 414. The hardware 400 includes a main extruder 402 and a co-extruder 404 that in combination form the beginnings of a multilayer thermoformable sheet. In either order, components are added to a hopper 406 of the main extruder 402 to form a first melt blend, and components are added a hopper 408 of the co-extruder 404 to form a second melt blend. The components may include any component, monomer, additive, rubber, copolymer, or polymer described herein, including any type of monovinylidene aromatic monomers described herein. The main extruder 402 feeds the first melt blend into a multilayer manifold 412 to form an inner stream 428. The co-extruder 404 splits the second melt blend into the multilayer manifold 412 by splitting the second melt blend into two arms 416a, 416b that layer the second melt blend above and below the inner layer 422 to form a top stream 424a and a bottom stream 424b. Another co-extruder 410 feeds a third melt blend into the multilayer manifold 412 to form a gloss stream 426. The top stream 424a, bottom stream 424b, inner stream 428, and the gloss stream 426 converge and are extruded out of the multilayer manifold 412 to form a thermoformable sheet 414 having a gloss layer 420 from the gloss stream 426; a top layer 418b from the top stream 424a; a bottom layer 418a from a bottom stream 424*b*; and an inner layer 422 sandwiched between the top layer 418*b* and the bottom layer 418*a* from an inner stream 428.

In FIGS. 3 and 4, the main extruder or co-extruders may be run at any temperature sufficient to blend one or more ingredients to be fed into a multilayer manifold or feed block. For example, the main extruder or co-extruders may be run at 200 degrees Celsius or more, 215 degrees Celsius or more, or 230 degrees Celsius or more. The main extruder or co-extruders may be run at 240 degrees Celsius or less, 225 degrees Celsius or less, or 210 degrees Celsius or less. The multilayer manifold or feed block may be run at any temperature sufficient to organize and from a multilayer thermoformable sheet. For example, the multilayer manifold or feed block may be run at 205 degrees Celsius or more, 220 degrees Celsius or more, or 235 degrees Celsius or more. The multilayer manifold or feed block may be run at 245 degrees Celsius or less, 230 degrees Celsius or less, or 215 degrees Celsius or less.

The formed chain extended and/or branched copolymers may have polymodal molecular weight distributions. Polymodal means that the polymer mixture contains more than one molecular weight peak when the molecular weight is measured. This means that the mixture shows a number of molecular weight distribution peaks at multiples of the average molecular weight of the chain extended copolymers of one or more vinylidene aromatic monomers and one or more unsaturated compounds containing a nucleophilic group.

The amount of rubber crosslinking may be quantified by the light absorbance ratio (LAR). LAR is the ratio of light absorbance for a suspension of the rubber particles in dimethyl formamide (DMF) and the light absorbance for a suspension of the rubber particles in dichloromethane (DCM). LAR may be determined using Brinkmann model PC 800 probe colorimeter equipped with a 450 nm wavelength filter, from Brinkman Instruments Inc. Westbury, New York or equivalent. In a first vial, 0.4 gram sample of rubber-modified copolymer is dissolved in 40 mL DMF. From the first vial, 5 mL of the resulting DMF solution is added to a second vial containing 40 mL of DMF. From the first vial, 5 mL of the resulting DMF solution is added to a third vial containing 20 mL DCM. The probe is zeroed in neat DMF. The absorption of the DMF solution (i.e., $A_{dmf}$) in the second vial and the absorption of the DCM solution (i.g., $A_{DCM}$) in the third vial are determined. The light absorbance ratio is calculated by the following equation:

$$LAR = A_{DMF} / A_{DCM}$$

The composition may exhibit a Brinkman Crosslink Index from 0.6 to 0.8.

Extensional viscosity measurements on the articles or structures herein may be conducted using an Anton Paar MCR 302 rheometer with a SER-3 extensional fixture. Compression molded samples were prepared by re-compressing injection molded parts of 4×10 mm to a thickness of 0.6-0.8 mm. From the obtained sheets strips were cut of 10 mm wide and 20 mm long for extensional measurements. The applied extension rate was 10 $s^{-1}$. The extensional viscosity data was measured after 3 seconds. The measurements were performed at 200° C. Elongational Viscosity after 3 seconds at 200 degrees C. may be higher than 75,000 Pa·s.

The gel content of the copolymers herein is a measure for the amount of crosslinked rubber, graft layer, and occlusions. The composition is initially weighted and then heated under nitrogen to a temperature of about 280 degrees C. for about 2 hours to fully cross link the rubber. The composition is then placed in toluene at 25 degrees C. The toluene and soluble polymer is removed. The remaining gel is dried and then reweighed. The gel content is the weigh percent of the composition that remains in the dried gel, expressed in units of weight percent. The gel content may be higher than 25 percent, higher than 30 percent, or higher than 35 percent.

The Environmental Stress Crack Resistance is a measure how well the composition can cope with chemical attack from typical foodstuff media in fridges like food oils. The ESCR testing may be conducted according to ISO 22088-3 on injection molded ISO type bars, under 1% flexural strain exposed to a food oil for 10 days. The absolute elongation at rupture, measured according to ISO 527, may be higher than 5%, or higher than 20%, or higher than 30% or higher than 35%.

The Environmental Stress Crack Resistance on a thermoformed extruded mono or multilayer sheet may be conducted by measuring the creep force over time under a pre-set strain of 0.35% and upon exposure to a food oil, during the entire creep time. The pre-set strain is controlled with extensometers. The speed of relative decay in creep force versus time, may be a measure for the ESCR. A slower decay in creep force illustrates a better ESCR. Samples may break during the test, after a certain creep time, indicating insufficient ESCR. A relative comparison is done versus 1 hour of creep time, the 1 hour is allow the sample to settle against the pre-set strain of 0.35%.

ENUMERATED EMBODIMENTS

1. A composition comprising:
   a thermoformable sheet having three of more layers wherein:
   an inner layer comprising postconsumer recycled monovinylidene aromatic monomer containing polymers which are impact modified by a rubber, post-industrial recycled monovinylidene aromatic monomer containing polymers which are impact modified by a rubber, and optionally, virgin monovinylidene aromatic monomer containing polymers which are impact modified by a rubber;
   two layers adjacent to the inner layer comprise one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin, which exhibit resistance to environmental stress cracking wherein at least one of the two layers is an outer layer; and
   optionally, an outer layer which is a gloss layer.

2. The composition according to Embodiment 1 wherein the one or more monovinylidene aromatic containing polymers which are impact modified by a rubber and exhibit resistance to environmental stress cracking comprise:
   I) one or more copolymers of one or more vinylidene aromatic monomers and one or more unsaturated compounds containing nucleophilic groups, wherein;
      a) the copolymer has on average about 0.02 to about 3.0 percent by weight of nucleophilic groups pendant from the copolymer, the copolymer is chain extended and/or branched by one or more copolymers of one or more vinylidene aromatic monomers and one or more unsaturated compounds having electrophilic groups; and optionally, a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides; or b) the copolymer having on average about 0.01 to about 15.0 percent by weight of nucleophilic groups pendant from the copolymer and a portion of the chains of the copolymer are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides;

wherein the composition contains a rubber based impact modifier; or

II) a rubber-modified monovinyl aromatic polymer including about 90 weight percent or more of a rigid monovinyl aromatic polymer matrix, based on the total weight of the composition and from about 2 to about 10 weight percent of one or more elastomeric polymers.

3. The composition according to Embodiment 1 or 2 wherein the inner layer comprises from about 10 to about 50 percent by weight of postindustrial recycled monovinylidene aromatic monomer containing polymers; from about 10 to about 90 percent by weight of postconsumer recycled monovinylidene aromatic monomer containing polymers; from about 0 to about 40 percent by weight of virgin monovinylidene aromatic monomer containing polymers, wherein the percentages are based on the weight of the layer.

4. The composition according to any of the preceding Embodiments wherein the structure contains three layers wherein the two layers adjacent to the inner layer each comprise from about 5 percent to about 25 percent by weight and the inner layer comprises 50 to 90 percent by weight based on the weight of the structure.

5. The composition according to any of Embodiments 1 to 3 wherein the structure contains three layers wherein the two layers adjacent to the inner layer each comprise from about 5 percent to about 25 percent by weight and the inner layer comprises 45 to 89 percent by weight based on the weight of the structure.

6. The composition according to any one of Embodiments 1 to 3 wherein the structure contains four layers comprising a gloss layer which comprises about 1 to about 5 percent by weight, two layers adjacent to the inner layer each comprise from about 5 percent to about 25 percent by weight wherein one layer is an outer layer and the other is located between the inner layer and the gloss layer and the inner layer comprises 45 to 89 percent by weight based on the weight of the structure.

7. The composition according to any one of Embodiments 2 to 6 wherein:
one or more monovinylidene aromatic containing polymers which are impact modified by a rubber and exhibit resistance to environmental stress cracking;
have a Mz+1 of about 600,000 to about 2,500,000 and a gel content of 30 or higher.

8. The composition according to Embodiment 7 wherein rubber impact modifier is about 5.0 to about 10 percent by weight or greater based on the weight of the copolymer and the impact modifier.

9. A composition according to Embodiments 7 or 8 wherein the impact modifier has an average particle size of about 2 to about 15 microns.

10. A composition according to any one of Embodiments 7 to 9 wherein the elongational viscosity after 3 seconds at 200° C. is 75,000 Pa/s or greater.

11. The composition according to any of the preceding Embodiments wherein one or more copolymers of one or more vinylidene aromatic monomers and one or more one or more unsaturated compounds containing nucleophilic groups, the copolymer having about 0.01 to about 15.0 percent by weight of the one or more unsaturated compounds containing nucleophilic groups wherein the nucleophilic groups are pendant from the copolymer; wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant acid groups with a metal cation having a valence of 2 or greater or ii) complexation between pendant acid groups and metal oxides.

12. The composition according to any one of the preceding Embodiments wherein the one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, the copolymer being chain extended and or branched by one or more copolymers of one or more vinylidene aromatic monomers and one or more unsaturated compounds having electrophilic groups.

13. The composition according to any one of the preceding Embodiments wherein the one or more copolymers of one or more vinylidene aromatic monomers and one or more unsaturated compounds containing nucleophilic groups, the copolymer having on average about 0.01 to about 3.0 percent by weight of nucleophilic groups pendant from the copolymer, wherein;
a) the copolymer being chain extended and or branched by one or more copolymers of one or more vinylidene aromatic monomers and one or more unsaturated compounds having electrophilic groups in an amount sufficient to react with about 0.02 to about 3.0 percent by weight of nucleophilic groups pendant from the copolymer; and,
b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides.

14. The composition according to any one of the preceding Embodiments wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

15. The composition according to any one of one of the preceding Embodiments wherein the nucleophilic groups are carboxylic acid groups and the electrophilic groups are one or more of epoxide groups.

16. The composition according to any one of the preceding Embodiments wherein the copolymer of one or more vinylidene aromatic monomers and one or more unsaturated compounds containing a nucleophilic group contains from about 0.5 to about 1.5 percent by weight nucleophilic groups.

17. The composition according to any one of the preceding Embodiments wherein the crosslinks i) ionic bonding of anions formed from the pendant acid groups with a metal cation having a valence of 2 or greater or ii) complexation between pendant acid groups and metal oxides are reversible and the weight average molecular weight of the copolymer of one or more vinylidene aromatic monomers and one or more unsaturated acids is substantially the same after the crosslinking is reversed as it is before crosslinking.

18. The composition according to any one of the preceding Embodiments wherein the metal is one or more of transition metals, post transition metals, metalloids or an alkaline earth metals.

19. The composition according to any one of the preceding Embodiments wherein the copolymer of the one or more vinylidene aromatic monomers and one or more compounds containing a nucleophilic group may further comprise one or more (meth)acrylates, unsaturated nitriles or conjugated dienes.

20. The composition according to any one of the preceding Embodiments wherein the equivalents ratio of metal ions to equivalents of anions formed from pendant acid groups on the copolymer is from about 40:1 to about 1:40.

21. The composition according to any one of the preceding Embodiments wherein the nucleophilic groups are carboxylate, carboxylic acid, alcohol, phenol, amine, aniline, imidazole, tetrazole, thiol, boronic acid, glycol, hydrazine or hydroxyl amine groups.

22. The composition according to any one of any one of the preceding Embodiments wherein the one or more nucleophilic groups are unsaturated acids which comprise carboxylic acids, unsaturated aromatic acids, sulfonic acids, phosphorous based acids, boronic acids, or mixtures thereof.

23. The composition according to any one of the preceding Embodiments comprising from about 20 to about 99.5 percent by weight of the copolymer and from about 6 to about 50 percent by weight of the impact modifier based on the weight of the composition.

24. The composition according to any one of any one of the preceding Embodiments wherein the rubber-modified monovinyl aromatic polymer including about 90 weight percent or more of a rigid monovinyl aromatic polymer matrix, based on the total weight of the composition; and from about 2 to about 7.5 weight percent of one or more elastomeric polymers; wherein the monovinyl aromatic polymer includes one or more monovinyl aromatic monomers, and the monovinyl aromatic polymer has a sufficiently high molecular weight so that the retention in the elongation at break after 10 days in corn oil at 1% strain is about 15% or more wherein the molecular weight of the monovinyl aromatic polymer is characterized by a weight average molecular weight of 200,000 g/mol or more.

25. The composition according to Embodiment 24 wherein the elastomeric polymer is present as grafted and cross-linked rubber particles dispersed within the monovinyl aromatic polymer matrix.

26. The composition according to Embodiment 24 or 25 wherein the monovinyl aromatic polymer is characterized by a polydispersity index of 2.5 or more.

27. The composition according to any one of the preceding Embodiments wherein the blend of one or more monovinylidene aromatic monomer containing polymers and a polyolefin comprises a matrix of one or more impact modified monovinylidene aromatic monomer containing polymers and one or more copolymers of monovinylidene aromatic monomers and conjugated dienes having a dispersed phase of one or more polyolefins.

28. The composition according to any one of the preceding Embodiments wherein the gloss layer comprises one or more monovinylidene aromatic monomer containing polymers which are impact modified having a particle size below 1.5 microns and a rubber content of from 5 to 15 percent by weight of the polymer.

29. The composition according to any one of the preceding Embodiments wherein the one or more monovinylidene aromatic monomer and unsaturated nitrile containing copolymers have an unsaturated nitrile content of 15 percent by weight or less, a rubber content of about 6 to about 18 percent by weight and an average rubber particle size of about 0.6 to about 2.0 microns wherein the percent by weight is based on the weight of the copolymers.

30. The composition according to any one of the preceding Embodiments which comprises a sheet having three layers and an overall thickness of about 3.0 to about 6.0 millimeters wherein the inner layer has a thickness of about 1.5 mm to about 5.4 mm; the layers adjacent to the inner layer have a thickness of about 0.15 mm to about 1.5 mm.

31. The composition according to any one of the preceding Embodiments which comprises a sheet having three layers wherein one layer adjacent to the inner layer is adapted to withstand degradation when exposed to a foamed polymer layer and the second layers adjacent to the inner layer is adapted to withstand degradation when exposed to food.

32. The composition according to any one of the preceding Embodiments which comprises a sheet having four layers and an overall thickness of about 3.0 to about 6.0 millimeters wherein the inner layer has a thickness of about 1.35 mm to about 5.34 mm; the gloss layer has a thickness of about 0.03 mm to about 0.3 mm, the layers adjacent to the inner layer have a thickness of about 0.15 mm to about 1.5 mm.

33. The composition according to any one of the preceding Embodiments which comprises a sheet having three layers and an overall thickness of about 0.5 to about 1.5 millimeters wherein the inner layer has a thickness of about 0.25 mm to about 1.35 mm; the layers adjacent to the inner layer have a thickness of about 0.025 mm to about 0.375 mm.

34. The composition according to any one of the preceding Embodiments which comprises a sheet having four layers and an overall thickness of about 0.5 to about 1.5 millimeters wherein the inner layer has a thickness of about 0.225 mm to about 1.335 mm; the gloss layer has a thickness of about 0.025 mm to about 0.075_mm, layers adjacent to the inner layer have a thickness of about 0.025 mm to about 0.375 mm.

35. The composition according to any one of the preceding Embodiments wherein the gloss layer comprises one or more monovinylidene aromatic monomer containing polymers which are impact modified having a particle size below 1.5 microns and a rubber content of from 5 to 15 percent by weight of the polymer.

36. The composition according to any one of the preceding Embodiments wherein the composition is in the form of a sheet adapted for use as a refrigerator liner.

37. The composition according to any one of the preceding Embodiments wherein the composition contains 30 percent by weight or greater of the composition of postconsumer recycled monovinylidene aromatic monomer containing polymers which are impact modified by a rubber.

38. A method comprising:
  a) forming a first melt blend of one or more monovinylidene aromatic monomer containing polymers which are impact modified by a rubber, one or more monovinylidene aromatic monomer and unsaturated nitrile containing copolymers, or a blend of one or more monovinylidene aromatic monomer containing polymers and a polyolefin;
  b) forming a second melt blend of postconsumer recycled monovinylidene aromatic monomer containing polymers which are impact modified by a rubber, postindustrial recycled monovinylidene aromatic monomer containing polymers which are impact modified by a rubber, and optionally, virgin monovinylidene aromatic monomer containing polymers which are impact modified by a rubber;
  c) splitting the first melt blend into two streams and separately feeding each of the streams to a multilayer feed block or multilayer manifold;
  d) feeding the second melt blend to the multilayer feed block or multilayer manifold; and
  e) feeding each layer through a die for form a sheet having three separate layers wherein the second melt stream forms a layer disposed between layers formed from the two streams of the first melt blend.

39. The method of Embodiment 38 wherein the first melt blend comprises the one or more monovinylidene aromatic containing polymers which are impact modified by a rubber wherein:
  the one or more copolymers of one or more vinylidene aromatic monomers and one or more unsaturated compounds containing nucleophilic groups having on average about 0.02 to about 3.0 percent by weight of nucleophilic groups pendant from the copolymer; the method further comprising feeding into the melt blend one or more copolymers of one or more vinylidene aromatic monomers and one or more unsaturated compounds having electrophilic groups under conditions such that the copolymer is chain extended and/or branched; and optionally, feeding to the melt blend a metal salt or a metal oxide having a valence of 2 or greater under conditions such that a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the metal salt pendant with the nucleophilic groups or ii) complexation between pendant nucleophilic groups and metal oxides.

40. The method of Embodiment 38 wherein the first melt blend comprises the one or more monovinylidene aromatic containing polymers which are impact modified by a rubber wherein the copolymer having on average about 0.01 to about 15.0 percent by weight of nucleophilic groups pendant from the copolymer feeding to the melt blend a metal salt or a metal oxide having a valence of 2 or greater under conditions such that a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the metal salt pendant with the nucleophilic groups or ii) complexation between pendant nucleophilic groups and metal oxides.

41. The method of Embodiment 39 comprising feeding into the first melt blend the one or more copolymers of one or more vinylidene aromatic monomers and one or more unsaturated compounds having electrophilic groups at the same time or after forming the first melt blend.

42. The method of Embodiment 39 comprising feeding into the first melt blend the metal salt or a metal oxide at the same time or after forming the first melt blend.

43. The method according to any one of Embodiments 38 to 42 wherein the second melt blend comprises from about 10 to about 50 percent by weight of postindustrial recycled monovinylidene aromatic monomer containing polymers; from about 10 to about 90 percent by weight of postconsumer recycled monovinylidene aromatic monomer containing polymers; from about 0 to about 40 percent by weight of virgin monovinylidene aromatic monomer containing polymers, wherein the percentages are based on the weight of the layer.

44. The method according to any of Embodiments 38 to 42 wherein the structure contains three layers wherein the two outer layers are prepared from the first melt blend and each layer comprises from about 5 percent to about 25 percent by weight and the inner layer prepared from the second melt blend comprises 50 to 90 percent by weight based on the weight of the structure.

45. The method according to any one of Embodiments 38 to 42 wherein the structure contains three layers wherein the two outer layers prepared from the first melt blend each comprise from about 5 percent to about 25 percent by weight and the inner layer prepared for the second melt blend comprises 45 to 89 percent by weight based on the weight of the structure.

46. The method of Embodiments 38 to 45 which comprises forming a third melt blend comprising one or more monovinylidene aromatic monomer containing polymers which are impact modified having a particle size below 1.5 microns and a rubber content of from 5 to 15 percent by weight of the polymer feeding the second melt blend to the multilayer feed block or multilayer manifold to form a fourth layer feeding the layer through the die along with the first three layers to form a sheet having four separate layers wherein the second melt stream forms a layer disposed between layers formed from the two streams of the first melt blend and the third melt blend forms a fourth layer disposed on one of the layers of the first melt blend.

47. The method according to Embodiment 46 wherein the structure contains four layers comprising a gloss layer of the third melt blend which comprises about 1 to about 5 percent by weight, two layers of the first melt blend which each comprise from about 5 percent to about 25 percent by weight wherein one layer is an outer layer and the other is located between the inner layer and the gloss layer and the inner layer formed from the second melt blend comprises 45 to 89 percent by weight based on the weight of the structure.

48. The method according to any one of Embodiments 38 to 47 wherein:
  the one or more monovinylidene aromatic containing polymers which are impact modified by a rubber and exhibit resistance to environmental stress cracking; have a Mz+1 of about 600,000 to about 2,500,000 and a gel content of 30 or higher.

49. The method according to Embodiment 48 wherein rubber impact modifier is about 5.0 to about 10 percent by weight or greater based on the weight of the copolymer and the impact modifier.

50. A method according to Embodiments 48 or 49 wherein the impact modifier has an average particle size of about 2 to about 15 microns.

51. The method according to any one of Embodiments 38 to 50 wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

52. The method according to any one of one of Embodiments 38 to 50 wherein the nucleophilic groups are carboxylic acid groups and the electrophilic groups are one or more of epoxide groups.

53. The method according to any one of Embodiments 38 to 51 wherein the copolymer of one or more vinylidene aromatic monomers and one or more unsaturated compounds containing a nucleophilic group contains from about 0.5 to about 1.5 percent by weight nucleophilic groups.

54. The method according to any one of Embodiments 38 to 51 wherein the metal is one or more of transition metals, post transition metals, metalloids or an alkaline earth metals.

55. The method according to any one of Embodiments 38 to 54 wherein the copolymer of the one or more vinylidene aromatic monomers and one or more compounds containing a nucleophilic group may further comprise one or more (meth)acrylates, unsaturated nitriles or conjugated dienes.

56. The method according to any one of Embodiments 38 to 55 wherein the equivalents ratio of metal ions to equivalents of anions formed from pendant acid groups on the copolymer is from about 40:1 to about 1:40.

57. The method according to any one of Embodiments 38 to 56 wherein the nucleophilic groups are carboxylate, carboxylic acid, alcohol, phenol, amine, aniline, imidazole, tetrazole, thiol, boronic acid, glycol, hydrazine or hydroxyl amine groups.

58. The method according to any one of Embodiments 38 to 56 wherein the one or more nucleophilic groups are unsaturated acids which comprise carboxylic acids, unsaturated aromatic acids, sulfonic acids, phosphorous based acids, boronic acids, or mixtures thereof.

59. The method according to any one of Embodiments 38 to 58 wherein the one or more monovinylidene aromatic monomer and unsaturated nitrile containing copolymers have an unsaturated nitrile content of 15 percent by weight or less, a rubber content of about 6 to about 18 percent by weight and an average rubber particle size of about 0.6 to about 2.0 microns wherein the percent by weight is based on the weight of the copolymers.

60. The method according to any one of Embodiments 38 to 59 wherein the formed sheet has three layers and an overall thickness of about 3.0 to about 6.0 millimeters wherein the inner layer has a thickness of about 1.5 mm to about 5.4 mm; the two outer layers have a thickness of about 0.15 mm to about 1.5 mm.

61. The method according to any one of Embodiments 38 to 59 wherein the formed structure comprises three layers wherein one outer layer is adapted to withstand degradation when exposed to foamed polymer layer and the second outer layer is adapted to withstand degradation when exposed to food.

62. The method according to any of one Embodiments 38 to 59 wherein the formed structure comprises four layers having an overall thickness of about 3.0 to about 6.0 millimeters wherein the inner layer has a thickness of about 1.35 mm to about 5.34 mm; the gloss layer has a thickness of about 0.03 mm to about 0.3 mm, one outer layer and the layer disposed between the inner layer and the gloss layer has a thickness of about 0.5 mm to about 1.5 mm.

63. The method according to any one of Embodiments 38 to 59 wherein the formed structure comprises three layers having an overall thickness of about 0.5 to about 1.5 millimeters wherein the inner layer has a thickness of about 0.25 mm to about 1.35 mm; the layers adjacent to the inner layer have a thickness of about 0.025 mm to about 0.375 mm.

64. The composition according to any one of Embodiments 38 to 59 four layers having an overall thickness of about 0.5 to about 1.5 millimeters wherein the inner layer has a thickness of about 0.225 mm to about 1.335 mm; the gloss layer has a thickness of about 0.025 mm to about 0.075 mm, layers adjacent to the inner layer have a thickness of about 0.025 mm to about 0.375 mm.

EXAMPLES

The following examples are provided to illustrate the disclosed polymers and processes but are not intended to limit the scope thereof. All parts and percentages are by weight unless otherwise indicated.
Ingredients
Blend 1 is a reference high impact polystyrene without branching.
Blend 2 is a branched high impact polystyrene.
Blend 3 is acrylic acid modified high impact polystyrene 1 without branching.
Blend 4 is acrylic acid modified high impact polystyrene 2 without branching.
Blend 5 is a branched Acrylic acid modified high impact polystyrene 2 melt blended at higher specific energy with 0.4 percent by weight of a polystyrene copolymer having pendant epoxide groups and 150 ppm zinc acetate.
Blend 6 is a branched Acrylic acid modified high impact polystyrene 2 melt blended at lower specific energy with 0.4 percent by weight of a polystyrene copolymer having pendant epoxide groups and 1500 ppm Zinc acetate.
Blend 7 is a branched high impact polystyrene, with MFR, % rubber, RPS and Brinkmann Crosslink data close to the reference Blend 1
Blend 8 is a Post Consumer Recycle impact modified polystyrene
Blend 9 is a Post Industrial Recycle impact modified polystyrene entirely based on Blend 1
ES1 is an Extruded monolayer thermoformable reference Sheet comprising of 40% Blend 1, 30% Blend 9 and 30% Blend 8 fabricated with an extrusion machine set up like shown in FIG. 3.
ES2 is an Extruded multilayer thermoformable Sheet with a structure like shown in FIG. 1 and fabricated with an extrusion machine set up like shown in FIG. 3. The outer layers 102a and 102b comprise entirely of Blend 1 and the inner layer 104 comprises of 20% Blend 1, 30% Blend 9 and 50% Blend 8. Such aiming at 30% post-consumer recycle impact modified polystyrene content for the entire sheet.
ES3 is an Extruded multilayer thermoformable Sheet with a structure like shown in FIG. 1 and fabricated with an extrusion machine set up like shown in FIG. 3. The outer layers 102a and 102b comprises entirely of Blend 7 and the inner layer 104 comprises of 20% Blend 7, 30% Blend 9 and 50% Blend 8. Such aiming at 30% post-consumer recycle impact modified polystyrene content for the entire sheet.

TF1 is a thermoformed fridge liner of ES1.
TF2 is a thermoformed fridge liner of ES2.
TF3 is a thermoformed fridge liner of ES3.

For evaluation of TF1, TF2 and TF3, samples were taken out of the back side of the liner, always at the same location.

| Property | Unit | Blend 1 | Blend 2 | Blend 3 | Blend 4 | Blend 5 | Blend 6 | Blend 7 | Blend 8 | Blend 9 |
|---|---|---|---|---|---|---|---|---|---|---|
| MFR | g/10' | 2.8 | 2.6 | 3.3 | 3.8 | 3.5 | 3.1 | 2.8 | | |
| % rubber | % | 7.7 | 6.8 | 7.7 | 7.9 | 7.9 | 7.9 | 7.9 | 3.0 | 7.7 |
| RPS*** | micron | 6.1 | 7.5 | 6.8 | 6.5 | 5.7 | 6.5 | 6.3 | 2.1 | 6.1 |
| Mw | Da | 195,900 | 227,400 | 184500 | 191,000 | 233,100 | 259,000 | 233,200 | | |
| Mz + 1 | Da | 454,000 | 651,000 | 447300 | 434,000 | 956,200 | 1,004,000 | 711.500 | | |
| MWD | | 2.19 | 2.63 | 2.30 | 2.23 | 2.97 | 3.01 | 2.71 | | |
| Acrylic acid | ppm | 0 | 0 | 10,000 | 500 | 500 | 500 | 0 | | |
| Brinkman Crosslink data | | 0.65 | 0.71 | 0.75 | 0.67 | 1.03 | 0.75 | 0.69 | | |
| Elong. Visc.* | Pa · s | 74,700 | 90,800 | 62,500 | 66,000 | 79,500 | 102,000 | 92,300 | | |
| Elong. Visc.** | Pa · s | 53,600 | 72,100 | 41,700 | 40,000 | 90,200 | 251,700 | 60,900 | | |

*After 3 seconds at 200deg C., derived from FIG. 5 and 6
**After 12 seconds at 200deg C., derived from FIG. 5 and 6
***Rubber Particle Size microns

TABLE 2

| Property | Unit | Blend 1 | Blend 7 |
|---|---|---|---|
| Elongation at Rupture* | % | 5.5 | 36.7 |

*After 10 days exposure to corn oil under 1% flexural strain

TABLE 3

| Property | Unit | ES1 | ES2 | ES3 |
|---|---|---|---|---|
| Overall thickness | mm | 4.09 | 4.10 | 4.07 |
| Thickness layer 102a | mm | | 0.76 | 0.71 |
| Thickness layer 102b | mm | | 0.75 | 0.83 |
| Thickness layer 104 | mm | | 2.59 | 2.53 |
| Average Weight layer 102a | Wt % | | 18.6 | 17.5 |
| Average Weight layer 102b | Wt % | | 18.2 | 20.4 |
| Average Weight layer 104 | Wt % | | 63.2 | 62.1 |

TABLE 4

| Property* | Unit | TF1 | TF2 | TF3 |
|---|---|---|---|---|
| Overall thickness | mm | 1.12 | 1.26 | 1.43 |
| Thickness layer 102a | mm | | 0.23 | 0.25 |
| Thickness layer 102b | mm | | 0.23 | 0.29 |
| Thickness layer 104 | mm | | 0.80 | 0.89 |
| Force** at 1 hour | N | 303 | 339 | 373 |
| Force** at 10 hours | N | 133 | 203 | 344 |
| Force** at 100 hours | N | 88 | 124 | 224 |
| Force** at 1000 hours | N | 0 (broken) | 99 | 179 |
| Relative Force decay 1 to 10 hours | % | 56 | 40 | 8 |
| Relative Force decay 1 to 100 hours | % | 71 | 63 | 40 |
| Relative Force decay 1 to 1000 hours | % | 100 | 71 | 52 |

*Determined on a sample taken from the back side of the liner, at the same location for TF1, TF2 and TF3
**Measured with a load cell on sample under a pre-load generating 0.35% initial strain, determined with extensometers, and sample exposed to corn oil

CONCLUSION

Branched high impact polystyrene samples Blend 2, Blend 5 and Blend 6 and Blend 7 resulted in significantly higher elongational viscosities at 3 seconds compared to non-branched reference polymer Blend 1 or acrylic acid containing non-branched polymers Blend 3 and Blend 4. (Table 1). Higher elongational viscosities enable improved thermoforming and branched HIPS resins are therefore preferred versus linear HIPS resins to compensate for the lower elongational viscosity due to the incorporation of postconsumer recycle, illustrated in Table 4 showing TF3 with a higher overall thickness compared to TF2, whereas the overall thicknesses of ES3 and ES2 are practically the same (Table 3). Surprisingly, as shown in Table 4, the multilayer ES2 shows a higher thickness after thermoforming (TF2) compared to the monolayer ES1 after thermoforming (TF1), whereas the total amount of postconsumer recycle for ES1 and ES2 is the same and the overall thickness is practically the same. For improved thermoforming, it is shown that a combination of multilayer structure and the use of branched and/or chain-extended HIPS in the outer layers and in the inner layer are preferred to compensate for the incorporation of postconsumer recycle HIPS. Branched Blend 7 resulted in substantially better Environmental Stress Crack Resistance (ESCR) against food oil compared to non-branched reference polymer Blend 1 (Table 2). Branched HIPS resins are therefore preferred versus linear HIPS resins to compensate for the lower ESCR of postconsumer recycle, illustrated in Table 4 showing TF3 with a much slower decay in creep forces compared to TF2. For TF3 it takes 10 times longer to decay 40% in creep force compared to TF2. In addition the residual creep force for TF3 after 1000 hours exposure is about 80% higher compared to TF2. Surprisingly the multilayer structure of TF2 shows a slower decay in creep forces compared to the monolayer structure of TF1, whereas the total amount of postconsumer recycle for ES1 and ES2 are the same. In addition, TF2 does not show breakage, whereas TF1 does. For a robust ESCR performance, it is shown that a combination of multilayer structure and the use of branched and/or chainextended HIPS in the outer layers and in the inner layer are preferred to compensate for incorporation of postconsumer recycle HIPS.

What is claimed is:

1. A composition comprising: a thermoformable sheet having three or more layers wherein: (i) an inner layer comprises: (1) postconsumer recycled monovinylidene aromatic monomer containing polymers which are impact modified by a rubber, (2) optionally, post-industrial recycled monovinylidene aromatic monomer containing polymers which are impact modified by a rubber, and (3) optionally, virgin monovinylidene aromatic monomer containing polymers which are impact modified by a rubber; (ii) two layers adjacent to the inner layer comprise a branched rubber modified monovinylidene aromatic polymer having a Mz+1 of about 600,000 to about 2,500,000; a Brinkman crosslink density of about 0.6 to 0.8; an elongational viscosity after 3 seconds at 200° C. of 75,000 Pa/s greater and a gel content of 30 or higher; wherein at least one of the two layers is an outer layer; and optionally, an outer layer which is a gloss layer.

2. The composition according to claim 1, wherein the inner layer comprises from about 10 to about 50 percent by weight of postindustrial recycled monovinylidene aromatic monomer containing polymers; from about 10 to about 90 percent by weight of postconsumer recycled monovinylidene aromatic monomer containing polymers; and from about 0 to about 40 percent by weight of virgin monovinylidene aromatic monomer containing polymers, wherein the percentages are based on the weight of the layer.

3. The composition according to claim 1, wherein the thermoformable sheet contains three layers wherein the two layers adjacent to the inner layer each comprise from about 5 percent to about 25 percent by weight and the inner layer comprises 50 to 90 percent by weight based on the weight of the thermoformable sheet.

4. The composition according to claim 1, wherein the thermoformable sheet contains four layers comprising a gloss layer which comprises about 1 to about 5 percent by weight, two layers adjacent to the inner layer each comprise from about 5 percent to about 25 percent by weight wherein one layer is an outer layer and the other is located between the inner layer and the gloss layer and the inner layer comprises 45 to 89 percent by weight based on the weight of the thermoformable sheet.

5. The composition according to claim 1, wherein the rubber impact modifier of the two layers adjacent to the inner layer is about 5.0 to about 10 percent by weight or greater based on the weight of the copolymer and the impact modifier.

6. The composition according to claim 1, which comprises a sheet having three layers and an overall thickness of about 3.0 to about 6.0 millimeters wherein the inner layer has a thickness of about 1.5 mm to about 5.4 mm; the layers adjacent to the inner layer each have a thickness of about 0.15 mm to about 1.5 mm.

7. The composition according to claim 1, which comprises a sheet having four layers and an overall thickness of about 3.0 to about 6.0 millimeters wherein the inner layer has a thickness of about 1.35 mm to about 5.34 mm; the gloss layer has a thickness of about 0.03 mm to about 0.3 mm, the layers adjacent to the inner layer each have a thickness of about 0.15 mm to about 1.5 mm.

8. The composition according to claim 1, which comprises a sheet having three layers and an overall thickness of about 0.5 to about 1.5 millimeters, wherein the inner layer has a thickness of about 0.25 mm to about 1.35 mm and the layers adjacent to the inner layer each have a thickness of about 0.025 mm to about 0.375 mm.

9. The composition according to claim 1, which comprises a sheet having four layers and an overall thickness of about 0.5 to about 1.5 millimeters, wherein the inner layer has a thickness of about 0.225 mm to about 1.335 mm, the gloss layer has a thickness of about 0.025 mm to about 0.075 mm and the layers adjacent to the inner layer each have a thickness of about 0.025 mm to about 0.375 mm.

10. The composition of claim 1, wherein the composition is in the form of a sheet adapted for use as a refrigerator liner.

11. The composition of claim 1, wherein the composition contains 30 percent by weight or greater of the composition of post-consumer recycled monovinylidene aromatic monomer containing polymers which are impact modified by a rubber.

12. The composition of claim 1, wherein the branched rubber modified monovinylidene aromatic polymer comprises:
    (1) one or more copolymers of one or more vinylidene aromatic monomers and one or more unsaturated compounds containing nucleophilic groups, wherein;
        (a) the copolymer has on average about 0.02 to about 3.0 percent by weight of nucleophilic groups pendant from the copolymer, the copolymer is chain extended and/or branched by one or more copolymers of one or more vinylidene aromatic monomers and one or more unsaturated compounds having electrophilic groups; and optionally, a portion of the chains of the copolymer of one or more vinylidene aromatic monomers and one or more nucleophilic groups are crosslinked with other chains of the copolymer of one or more vinylidene aromatic monomers and one or more nucleophilic groups by (i) ionic bonding of anions formed from the pendant nucleophilic groups with a metal cation having a valence of 2 or greater, or (ii) complexation between pendant acid groups and metal oxides; or
        (b) the copolymer having on average about 0.01 to about 15.0 percent by weight of nucleophilic groups pendant from the copolymer and a portion of the chains of the copolymer are crosslinked with other chains of the copolymer of one or more vinylidene aromatic monomers and one or more nucleophilic groups by (i) ionic bonding of anions formed from the pendant nucleophilic groups with a metal cation having a valence of 2 or greater, or (ii) complexation between pendant acid groups and metal oxides; wherein the composition contains a rubber based impact modifier.

13. The composition of claim 12, wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

14. The composition of claim 12, wherein the copolymer of one or more vinylidene aromatic monomers and one or more unsaturated compounds containing nucleophilic groups contains from about 0.5 to about 1.5 percent by weight nucleophilic groups.

15. A method of making the thermoformable sheet of claim 1, comprising:
   a) forming a first melt blend of a branched rubber modified monovinylidene aromatic polymer having a Mz+1 of about 600,000 to about 2,500,000; a Brinkman crosslink density of about 0.6 to 0.8 and an elongational viscosity after 3 seconds at 200° C. of 75,000 Pa/s or greater;
   b) forming a second melt blend of postconsumer recycled monovinylidene aromatic monomer containing polymers which are impact modified by a rubber, and optionally, post-industrial recycled monovinylidene aromatic monomer containing polymers which are impact modified by a rubber, and optionally, virgin monovinylidene aromatic monomer containing polymers which are impact modified by a rubber;
   c) splitting the first melt blend into two streams and separately feeding each of the streams to a multilayer feed block or multilayer manifold;
   d) feeding the second melt blend to the multilayer feed block or multilayer manifold; and
   e) feeding each layer through a die to form a thermoformable sheet having three separate layers wherein the second melt stream forms a layer disposed between layers formed from the two streams of the first melt blend.

16. The method of claim 15, which comprises forming a third melt blend comprising one or more monovinylidene aromatic monomer containing polymers which are impact modified having a particle size below 1.5 microns and a rubber content of from 5 to 15 percent by weight of the polymer, feeding the third melt blend to the multilayer feed block or multilayer manifold to form a fourth layer, feeding the fourth layer through the die along with the first three layers to form a sheet having four separate layers wherein the second melt stream forms a layer disposed between layers formed from the two streams of the first melt blend and the third melt blend forms a fourth layer disposed on one of the layers of the first melt blend.

17. The method according to claim 16, wherein the structure contains four layers comprising a gloss layer of the third melt blend which comprises about 1 to about 5 percent by weight, two layers of the first melt blend which each comprise from about 5 percent to about 25 percent by weight, wherein one of the two layers of the first melt blend is an outer layer and the other is located between the inner layer and the gloss layer and the inner layer formed from the second melt blend comprises 45 to 89 percent by weight, wherein the percentages are based on the weight of the structure.

18. The method of claim 15, wherein the second melt blend comprises from about 10 to about 50 percent by weight of postindustrial recycled monovinylidene aromatic monomer containing polymers; from about 10 to about 90 percent by weight of postconsumer recycled monovinylidene aromatic monomer containing polymers; and from about 0 to about 40 percent by weight of virgin monovinylidene aromatic monomer containing polymers, wherein the percentages are based on the weight of the layer.

\* \* \* \* \*